United States Patent
Müller et al.

(10) Patent No.: US 9,749,926 B2
(45) Date of Patent: Aug. 29, 2017

(54) METHODS AND APPARATUSES FOR CONFIGURING A WIRELESS DEVICE TO EVALUATE HANDOVER EVENTS

(71) Applicant: Telefonaktiebolaget L M Ericsson (publ), Stockholm (SE)

(72) Inventors: Walter Müller, Upplands Väsby (SE); Zhiyi Xuan, Täby (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 14/769,486

(22) PCT Filed: Mar. 27, 2013

(86) PCT No.: PCT/SE2013/050348
§ 371 (c)(1),
(2) Date: Aug. 21, 2015

(87) PCT Pub. No.: WO2014/142725
PCT Pub. Date: Sep. 18, 2014

(65) Prior Publication Data
US 2016/0014666 A1    Jan. 14, 2016

Related U.S. Application Data

(60) Provisional application No. 61/787,921, filed on Mar. 15, 2013.

(51) Int. Cl.
*H04W 36/00* (2009.01)
*H04W 36/30* (2009.01)
(Continued)

(52) U.S. Cl.
CPC ........... *H04W 36/30* (2013.01); *H04W 24/02* (2013.01); *H04W 36/0083* (2013.01);
(Continued)

(58) Field of Classification Search
CPC ..................................... H04W 36/30
See application file for complete search history.

(56) References Cited

U.S. PATENT DOCUMENTS

2009/0239535 A1* 9/2009 Chun ............... H04J 11/0069
455/435.2
2011/0170496 A1* 7/2011 Fong ................. H04L 5/0053
370/329
(Continued)

FOREIGN PATENT DOCUMENTS

KR        20120093984 A    8/2012
WO        2008157800 A1    12/2008
(Continued)

OTHER PUBLICATIONS

Huawei, "Combined RSRP & RSRQ quantities report triggering", 3GPP TSG RAN WG2 #62bis, Warsaw, Poland, Jun. 30, 2008, pp. 1-3, R2-083546
(Continued)

*Primary Examiner* — Idowu O Osifade
(74) *Attorney, Agent, or Firm* — Coats & Bennett, PLLC

(57) ABSTRACT

A method in a primary network node for handling a handover of a wireless device from a primary cell serviced by the primary network node to a neighbor cell serviced by a neighbor network node. The method comprises sending a configuration message to the wireless device, comprising instructions to evaluate in parallel a first handover event and a second handover event. The first event is based on signal quality measurements from both cells. The second event is based on signal strength measurements from both cells. To evaluate comprises determining if an entering condition for each of the events is satisfied. The method further comprises sending a handover command to the wireless device when one of: the entering condition for the first handover event is
(Continued)

satisfied over a first time period, and the entering condition for the second handover event is satisfied over a second time period.

24 Claims, 10 Drawing Sheets

(51) Int. Cl.
H04W 24/02 (2009.01)
H04W 36/14 (2009.01)
H04W 36/16 (2009.01)

(52) U.S. Cl.
CPC ....... *H04W 36/0088* (2013.01); *H04W 36/14* (2013.01); *H04W 36/165* (2013.01)

(56) References Cited

U.S. PATENT DOCUMENTS

| 2013/0064226 A1* | 3/2013 | Dinan | H04W 36/0083 370/332 |
| 2013/0136015 A1* | 5/2013 | Ojala | H04L 5/001 370/252 |
| 2013/0242965 A1* | 9/2013 | Horn | H04W 24/10 370/338 |

FOREIGN PATENT DOCUMENTS

| WO | 2012140470 A1 | 10/2012 |
| WO | 2014/075708 A1 | 5/2014 |

OTHER PUBLICATIONS

3rd Generation Partnership Project, "3rd Generation Partnership Project; Technical Specification Group Radio Access Network; Evolved Universal Terrestrial Radio Access (E-UTRA) and Evolved Packet Core (EPC); User Euipment (UE) conformance specification; Part 1; Protocol conformance specification (Release 11)", Technical Specification, 3GPP TS 36.523-1 V.11.1., Dec. 1, 2012, pp. 1215-1231, 3GPP.

3GPP. "Technical Specification Group Radio Access Network; Evolved Universal Terrestrial Radio Access (E-UTRA) and Evolved Universal Terrestrial Radio Access Network (E-UTRAN); Overall description; Stage 2 (Release 11)." 3GPP TS 36.300 V11.4.0. Dec. 2012. 3GPP, Sophia Antipolis, France.

3GPP. "Technical Specification Group Radio Access Network; Evolved Universal Terrestrial Radio Access (E-UTRA); Radio Resource Control (RRC); Protocol specification (Release 11)." 3GPP TS 36.331 V11.2.0. Dec. 2012. 3GPP, Sophia Antipolis, France.

Ericsson. "Use Cases of UE Measurements in Mobility Scenarios." 3GPP Draft R4-071693. Oct. 2007. 3GPP, Sophia Antipolis, France.

Renesas Electronics Europe. "RSRQ measurements for TDM eICIC." 3GPP Draft R4-110935. Feb. 2011. 3GPP, Sophia Antipolis, France.

* cited by examiner

METHODS AND APPARATUSES FOR CONFIGURING A WIRELESS DEVICE TO EVALUATE HANDOVER EVENTS

TECHNICAL FIELD

Embodiments herein relate to a primary network node, a wireless communications network, and methods therein. In particular, embodiments herein relate to handling a handover.

BACKGROUND

Communication devices such as wireless devices are also known as e.g. User Equipments (UE), mobile terminals, wireless terminals and/or mobile stations. Wireless devices are enabled to communicate wirelessly in a wireless communications system or wireless communication system, sometimes also referred to as a cellular radio system or cellular networks. The communication may be performed e.g. between two wireless devices, between a wireless device and a regular telephone and/or between a wireless device and a server via a Radio Access Network (RAN) and possibly one or more core networks, comprised within the wireless communications system.

Wireless devices may further be referred to as mobile telephones, cellular telephones, or laptops with wireless capability, just to mention some further examples. The wireless devices in the present context may be, for example, portable, pocket-storable, hand-held, computer-comprised, or vehicle-mounted mobile devices, enabled to communicate voice and/or data, via the RAN, with another entity, such as wireless device or a server.

The wireless communications system covers a geographical area which is divided into cell areas, wherein each cell area being served by a base station, e.g. a Radio Base Station (RBS), which sometimes may be referred to as e.g. "eNB", "eNodeB", "NodeB", "B node", or BTS (Base Transceiver Station), depending on the technology and terminology used. The base stations may be of different classes such as e.g. macro eNodeB, home eNodeB or pico base station, based on transmission power and thereby also cell size. A cell is the area of radio coverage provided by the base station at a base station site. One base station, situated on the base station site, may serve one or several cells. Further, each base station may support one or several communication technologies. The base stations communicate over the air interface operating on radio frequencies with the wireless devices within range of the base stations.

In some RANs, several base stations may be connected, e.g. by landlines or microwave, to a radio network controller, e.g. a Radio Network Controller (RNC) in Universal Mobile Telecommunications System (UMTS), and/or to each other. The radio network controller, also sometimes termed a Base Station Controller (BSC) e.g. in GSM, may supervise and coordinate various activities of the plural base stations connected thereto. GSM is an abbreviation for Global System for Mobile Communications (originally: Groupe Spécial Mobile).

In 3rd Generation Partnership Project (3GPP) Long Term Evolution (LTE), base stations, which may be referred to as eNodeBs or even eNBs, may be directly connected to one or more core networks.

UMTS is a third generation mobile communication system, which evolved from the GSM, and is intended to provide improved mobile communication services based on Wideband Code Division Multiple Access (WCDMA) access technology. UMTS Terrestrial Radio Access Network (UTRAN) is essentially a radio access network using wideband code division multiple access for wireless devices. The 3GPP has undertaken to evolve further the UTRAN and GSM based radio access network technologies.

According to 3GPP GSM EDGE Radio Access Network (GERAN), a wireless device has a multi-slot class, which determines the maximum transfer rate in the uplink and downlink direction. EDGE is an abbreviation for Enhanced Data rates for GSM Evolution. In the end of 3008 the first release, Release 8, of the 3GPP Long Term Evolution (LTE) standard was finalized and later releases have also been finalized.

In the context of this disclosure, the expression Downlink (DL) is used for the transmission path from the base station to the mobile station. The expression Uplink (UL) is used for the transmission path in the opposite direction i.e. from the mobile station to the base station.

In cellular telecommunications, the term handover refers to the process of transferring an ongoing call or data session from one cell to another and it may imply for some deployment scenarios transferring from one network node, i.e., a primary cell served by a primary node or source network cell served by a source node, connected to a core network, to another cell or network node, i.e., a neighbour cell or target cell served by a target network node. In a typical wireless communications network, one network node may serve many cells and each cell typically only covers a limited geographical area with some overlap; therefore, handover becomes a very important feature for the seamless mobility of wireless devices in the entire wireless communications network. The performance of handover also becomes an important factor that affects the user's experience and the amount of radio resources used for the connection. One main purpose of handover is to make sure the UE connection is always maintained by being served by the best frequency and cell.

In the Long Term Evolution (LTE) Radio Access Technology (RAT), a wireless device, e.g., a user equipment (UE) in Radio Resource Control_Connected (RRC_CONNECTED) mode, measures the signal strength, e.g. the Reference Symbol Received Power (RSRP), or the signal quality, e.g., Reference Symbol Received Quality (RSRQ), of the serving cell and neighbour cells, as schematically depicted in an example in FIG. 1. The wireless device reports the measurement results in a measurement report, either periodically or when they fulfil event criteria as defined by a network node, e.g., an eNB, such as the primary network node, according to, for example, 3rd Generation Partnership Project (3GPP) standard 36.331. One event criterion, event A5, is fulfilled when the neighbour cell, measured on a specific frequency and a Physical Cell Identity (PCI) on that frequency, gets stronger than an absolute threshold (Threshold 2) at the same time as the primary serving cell gets worse than another absolute threshold (Threshold 1) for at least a minimum amount of time, i.e. Time To Trigger. Optionally the primary network node may configure the wireless device to use Cell Individual Offset (CIO) added for a certain PCI, i.e., Threshold+Hysteresis+CIO. One event criterion, event A3, is fulfilled when the neighbour cell, measured on a specific frequency and a Physical Cell Identity (PCI) on that frequency, gets a certain amount stronger than the primary or serving, cell, i.e., the Offset+Hysteresis, for at least a certain minimum time, i.e., the Time to trigger. Optionally the primary network node may configure the wireless device to use Cell Individual Offset (CIO) added for a certain PCI, i.e., Offset+Hysteresis+CIO. This event is typically used as trigger for handover. That is, a handover is initiated by the primary network node after receiving a measurement report from the wireless device that indicates that at least one neighbour cell, e.g., PCI, fulfils the event criterion. There might be cases when several neighbour cells fulfil this criterion. If this happens, the wireless device sends a list, including these cells arranged in signal strength order, in the measurement report. The measurement report also contains information about measured RSRP and RSRQ for the primary cell cell and optionally RSRP and RSRQ measured values for the reported neighbour cells, e.g., PCIs. The primary network node selects the appropriate cell as neighbour (i.e., target) cell for handover, and then translates the wireless device-reported PCI to a NW address and NW network node and cell identity for handover preparation signalling purposes.

However, it is a problem in conventional networks that handover is sometimes triggered when not really necessary, resulting in wasted network resources, or that handover may be triggered too late, resulting in a dropped connection.

SUMMARY

It is an object of embodiments herein to improve the performance in a wireless communications network by providing an improved way to determine a condition for a handover event from a primary cell to a neighbour cell.

According to a first aspect of embodiments herein, the object is achieved by a method in a primary network node for handling a handover of a wireless device from a primary cell to a neighbour cell. The primary cell is serviced by the primary network node, and the neighbour cell is serviced by a neighbour network node. The wireless device, the primary network node, the primary cell, the neighbour network node and the neighbour cell are comprised in a wireless communications network. The method comprises sending a configuration message to the wireless device. The configuration message comprises instructions for the wireless device to evaluate in parallel a first handover event and a second handover event. The first handover event is based on signal quality measurements from the primary cell and the neighbour cell. The second handover event is based on signal strength measurements from the primary cell and the neighbour cell. To evaluate comprises determining if an entering condition for the first handover event is satisfied and if an entering condition for the second handover event is satisfied. The method further comprises sending a handover command to the wireless device when one of: the entering condition for the first handover event is satisfied over a first time period, and the entering condition for the second handover event is satisfied over a second time period.

According to a second aspect of embodiments herein, the object is achieved by a primary network node for handling a handover of a wireless device from a primary cell to a neighbour cell. The primary cell is serviced by the primary network node, and the neighbour cell is serviced by a neighbour network node. The wireless device, the primary network node, the primary cell, the neighbour network node and the neighbour cell are comprised in a wireless communications network. The primary network node comprises a sending circuit configured to send a configuration message to the wireless device. The configuration message comprises instructions for the wireless device to evaluate in parallel a first handover event and a second handover event. The first handover event is based on signal quality measurements from the primary cell and the neighbour cell. The second handover event is based on signal strength measurements from the primary cell and the neighbour cell. To evaluate comprises determining if an entering condition for the first handover event is satisfied and if an entering condition for the second handover event is satisfied. The primary network node 211 is further configured to send a handover command to the wireless device. This command is sent when one of: the entering condition for the first handover event is satisfied over a first time period, and the entering condition for the second handover event is satisfied over a second time period.

According to a third aspect of embodiments herein, the object is achieved by a method in a wireless communications network for handling a handover of a wireless device from a primary cell to a neighbour cell. The primary cell is serviced by the primary network node, and the neighbour cell is serviced by a neighbour network node. The wireless device, the primary network node, the primary cell, the neighbour network node and the neighbour cell are comprised in a wireless communications network. The method comprises sending, by the primary network node, a configuration message to the wireless device. The configuration message comprises instructions for the wireless device to evaluate in parallel a first handover event and a second handover event. The first handover event is based on signal quality measurements from the primary cell and the neighbour cell. The second handover event is based on signal strength measurements from the primary cell and the neighbour cell. To evaluate comprises determining if an entering condition for the first handover event is satisfied and if an entering condition for the second handover event is satisfied. The method further comprises to send a message from the wireless device to the primary network node, when one of: the entering condition for the first handover event is satisfied over a first time period, and the entering condition for the second handover event is satisfied over a second time period. The message comprises a measurement report. The method also comprises sending a handover command from the primary network node to the wireless device after receiving the message.

According to a fourth aspect of embodiments herein, the object is achieved by a wireless communications network for handling a handover of a wireless device from a primary cell to a neighbour cell. The primary cell is serviced by the primary network node, and the neighbour cell is serviced by a neighbour network node. The wireless device, the primary network node, the primary cell, the neighbour network node and the neighbour cell are comprised in a wireless communications network. The wireless communications network comprises a sending circuit in the primary network node. This sending circuit is configured to send by the primary network node, a configuration message to the wireless device. This configuration message comprises instructions for the wireless device to evaluate in parallel a first handover event and a second handover event. The first handover event is based on signal quality measurements from the primary cell and the neighbour cell. The second handover event is based on signal strength measurements from the primary cell and the neighbour cell. To evaluate comprises determining if an entering condition for the first handover event is satisfied and if an entering condition for the second handover event is satisfied. The wireless communications network further comprises a sending circuit in the wireless device. This sending circuit is configured to send a message from the wireless device to the primary network node. This is done either when one or both of the entering condition for the first handover event is satisfied over a first time period, or the entering condition for the second handover event is satisfied over a second time period. In any case, the message/s sent comprise/s a measurement report. The sending circuit in the primary network node is further configured to the send a handover command from the primary network node to the wireless device after receiving either or of these measurement reports.

By using two events in parallel, so that the measurements of signal strength and signal quality are both taken into account as conditions for handover, instead of basing the handover decision on either one of these measurements, the chances for a successful handover may be increased. That is, the probability of handover failure may be decreased.

Thus, an advantage according to embodiments herein is providing a system with improved performance that reduces the amount of used radio resources and, at the same time, still allows for subscriber satisfaction to be increased.

A further advantage according to embodiments herein is that the amount of measurement reporting done over the air interface is decreased. Thus, the overall capacity and efficiency of the wireless communications network may be increased, while the latency in the wireless communications network is decreased.

A further advantage according to embodiments herein is that the chances for a successful handover may be increased without increasing the amount of handovers significantly. Thus, the overall efficiency of the wireless communications network may be increased.

A further advantage according to embodiments herein is that the average radio resource, e.g. Physical Resource Block (PRB), consumption on the downlink signalling may be reduced. Thus, the overall capacity and efficiency of the wireless communications network are increased, while the latency in the wireless communications network is decreased.

BRIEF DESCRIPTION OF THE DRAWINGS

Examples of embodiments herein are described in more detail with reference to attached drawings in which.

DETAILED DESCRIPTION

Figure 1:
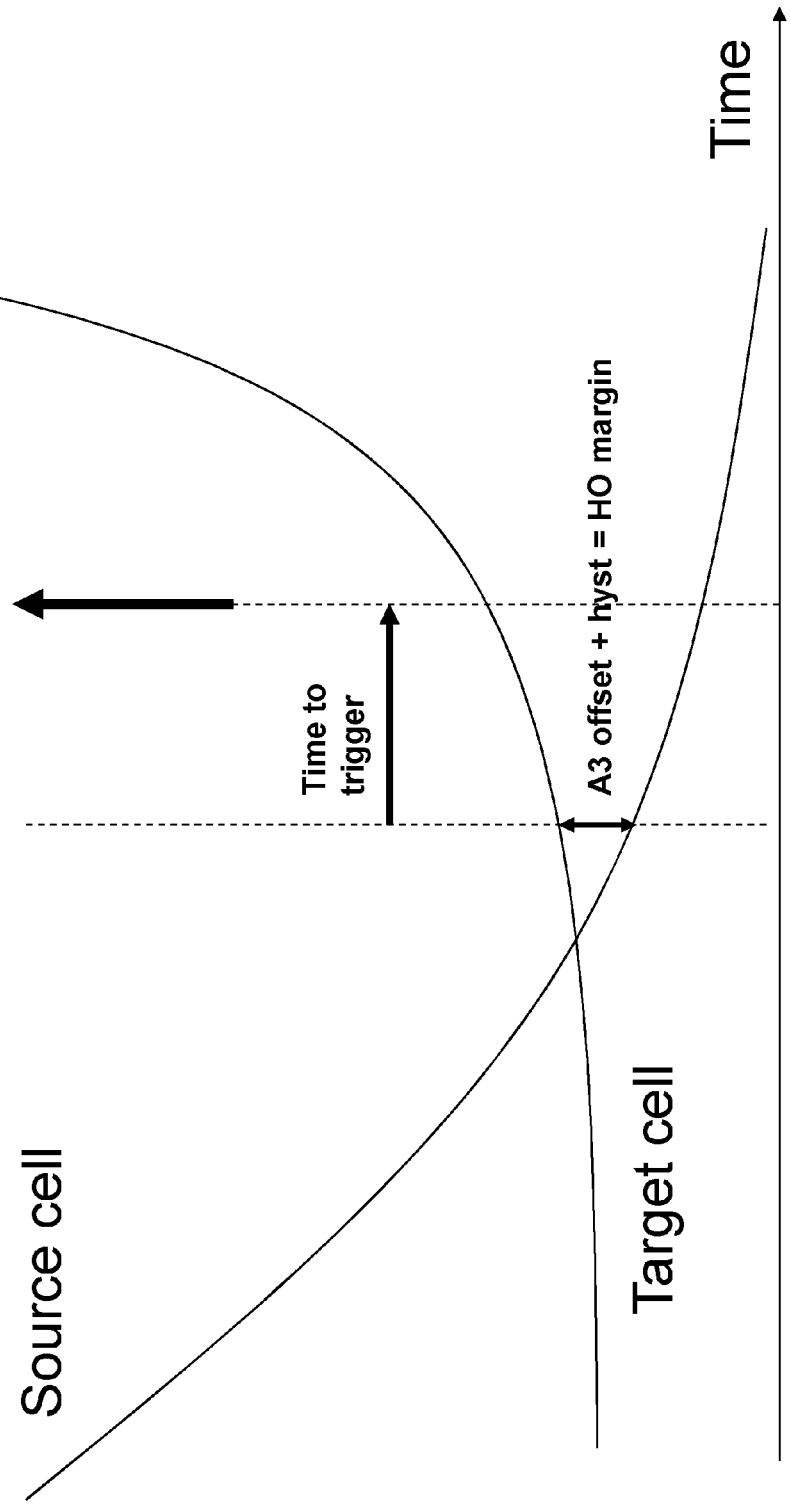
FIG. 1 is a schematic diagram illustrating a handover event according to prior art methods.

As part of the development of embodiments herein, the Applicant has recognized some causes for the above-mentioned problems, which will be described below.

In a handover event, such as the A3 event, the Offset may be the value of the difference between the measurement of signal strength of the primary cell and the measurement of signal strength of the neighbour cell that, when met, indicates that the signal from the neighbour cell has gotten sufficiently stronger, as configured by the operator of the network, than the primary or serving cell, to trigger a handover. If the difference between the measurement of signal strength of the primary cell and the measurement of signal strength of the neighbour cell meets the Offset for a configured period of time, i.e., the time to trigger, a chain of events will start that will conclude with the execution of a handover.

The Offset and time to trigger values may be configured by the network's operator, and they may be adjusted by the operator. The adjustment of Offset and time to trigger is a compromise between doing handover too early or too late and the number of handovers.

In general, the handover may need to be done as early as possible if the quality of the downlink signal is deteriorating fast, since the handover command sent to the wireless device must be able to reach the wireless device to execute the handover before the deterioration of the downlink signal has become too severe for the wireless device to receive the handover command.

Current standardized handover events that are based on signal strength, are isolated from events based on signal quality. Because of this, the network operator may need to decide at the cell level if handover problems are due to signal strength or to signal quality.

Since both signal strength and signal quality problems may exist at the same time, but in different parts of the cell, both signal strength and signal quality need to be evaluated. Under current standardized protocols, the choice of a signal strength-based, e.g. an RSRP-based, event, or a signal quality-based, e.g. an RSRQ-based, event trigger for handover is not possible without using two separate events. One event using signal strength, e.g., RSRP, as trigger quantity, and the other event using signal quality, e.g., RSRQ.

Also, in current standardized handover events, the event's entering criteria are either based on an absolute threshold comparison or on a relative comparison. That is, an absolute criterion is when a cell measurement, such as signal quality, is compared with an absolute threshold. A relative criterion is when a first cell measurement, such as signal strength, is compared with another cell measurement, and the difference is evaluated against a threshold.

A problem associated with the currently standardized handover methods may be when, for example, a primary cell and a neighbour cell may each have good power signals, and the power signal from the neighbour cell may be A3 offset better than that of the primary cell. In this case, an A3 measurement report will be triggered, and handover possibly triggered as well. However, the interference in the neighbour cell may be far higher than that in the primary cell due to e.g., load. Thus, a handover to the neighbour cell would not only be unnecessary, it would also have adverse consequences for the communication with the wireless device.

Embodiments herein address these problems, by evaluating two handover events in parallel: one event based on absolute criteria, such as an A5 event, and on signal quality, and one event based on a relative criterion, such as an A3 event, and on signal strength.

In particular, embodiments herein are based on the fact that event A5 has two purposes: one is to evaluate when the primary cell signal quality is below threshold 1 and the other is to evaluate that the difference in signal quality between the neighbour cell and the primary cell is above the difference of threshold 2−threshold 1. Furthermore, the signal quality, e.g., RSRQ, difference between two cells on the same frequency is roughly equal to the signal strength, e.g., RSRP, difference according to 3GPP definition of the measurements. Since typically signal quality goes bad much earlier than signal power, when a wireless device is interfered, embodiments herein provide for a method to trigger handover earlier when signal quality is poor, as described below, by relying on a signal quality evaluation.

Embodiments herein use a first handover event based on absolute criteria, i.e., a primary cell becomes worse than a first threshold and a neighbour cell becomes better than a second threshold, based on signal quality measurements, e.g., an RSRQ-A5 event. Embodiments herein also use in parallel a second handover event based on a relative criterion, i.e., the neighbour cell becomes offset better than the primary cell, based on signal strength measurements, e.g., an RSRP-A3 event. If a network node, such as the primary node, receives a measurement report from either event, e.g. A5 or A3, a handover process is started.

The first threshold, e.g., the A5 threshold 1, is set so the entering criterion is fulfilled when the primary cell is bad enough. The second threshold, e.g., A5 threshold 2, is set so the entering criterion is fulfilled when neighbour cell signal quality, e.g., RSRQ, is "offset" better. "Offset", i.e., threshold 2−threshold1, typically is significantly less than the offset used for the second handover event, e.g., the A3 event, which is evaluated in parallel.

The offset for the second handover event, e.g., A3, is typically set to the same value as before the extra first event, e.g., A5, was used. For example, in some embodiments, A5 is the first handover event, and it is based on RSRQ, and A3 is the second handover event, and it is based on RSRP. Then, the A5 Threshold 1 (Thresh1) could be configured to be RSRQ=−15 dB. The A5 Threshold 2 (Thresh2) could be configured to be RSRQ=−15 dB+1 dB, i.e., the signal quality of the neighbour needs to be 1 dB better. The Thresh1 and Thresh2 setting will give an implicit offset of 1 dB. Thresh 1 and Thresh 2 are absolute thresholds and the A5 implicit offset reflects the difference between Thresh 1 and Thresh 2. The A3 offset could be set to offset=3 dB. Then, in this example, the net outcome would be: if the A5 event measurement report is received by a network node, e.g. an eNB, the handover will be triggered when RSRQ is bad (A5 Thresh 1) and when at least 1 dB handover margin exists between the primary cell and the neighbour cell (A5 Thresh 2−A5 Thresh 1). If the A3 event measurement report is received by the network node, e.g. the eNB, the handover will be triggered when the RSRP of the primary cell is at least 3 dB better than the RSRP of the neighbour cell (RSRP neighbor-RSRP primary).

Thus, in this example, when the primary cell is bad, the handover will be triggered 2 dB earlier, and typically before the DL signal becomes interfered by the neighbour cell, i.e., before the handover command reception by the wireless device fails. When the primary cell signal quality is good, the A3 measurement report will trigger a handover as before, with a large handover margin of, for example, 3 dB to avoid ping pong and excessive amount of handovers.

The embodiments herein will also work for an Interfrequency handover, i.e., when the primary cell or source cell, is on one frequency and the neighbour or target cell, is on another frequency. A3 evaluation of two inter frequency cells that have large overlap, e.g., two co-located carriers, will happen more often than between Intra frequency cells. This is due to the fact that the cells on the different carriers are of equal strength over a large area, whereas Intra frequency cells cannot have the same overlap due to interference reasons. Thus, in the case of interfrequency cells, the handover may be triggered earlier, based on the A5 type of evaluation, if the serving cell is bad and the neighbour cell is good enough, and later, based on A3, if the serving cell is good. Hence, in these cases, excessive measurement reporting can be avoided.

According to embodiments herein, a primary network node may configure a wireless device for evaluation of two handover events in parallel. One handover event, which will be referred to as a "first handover event" is based on two absolute criteria. As stated earlier, an absolute criterion is when a cell measurement, such as signal quality, is compared with an absolute threshold. For example, in some embodiments, the absolute criteria may be based on an RSRQ absolute threshold for evaluating the signal quality of the primary, i.e., serving, cell and the neighbouring, i.e., target, cell. The other handover event, which will be referred to as a "second handover event" is based on a relative criterion. As stated earlier, a relative criterion is when a first cell measurement, such as signal strength, is compared with another cell measurement, and the difference is evaluated against a threshold. For example, in some embodiments, the relative criterion may evaluate a primary-neighbour, i.e., source-target, signal strength, e.g., RSRP, difference.

In this way, the event triggering may adapt to the network conditions, and trigger handover only when motivated from better signal strength, regardless of absolute level, and when signal quality of the serving cell is bad, and at the same time ensure that there is some minimum amount of hysteresis. Hence, extra signalling associated by using two nonparallel separate events may be avoided, e.g., reconfigure RSRP based A3 offset when signal quality is reported to be bad.

An advantage of some embodiments herein is that, by using an absolute threshold for the first entering condition and a difference threshold for the second event, i.e., the magnitude of the signal strength difference between neighbor cell and primary cell, for the entering condition of the second event, it is possible to enable that the handover is done to a better neighbour cell, regardless of the absolute signal strength levels for primary cell and neighboring cell.

A further advantage according to embodiments herein is that the handover trigger is self-adjusting on experienced local conditions without the need for a network node to send new event conditions to the wireless device, although the adaptations may still be based on network defined rules.

A further advantage according to embodiments herein is that the speed of adaptation per wireless device is larger. Thus, the overall capacity and efficiency of the wireless communications network may be increased, while the latency in the wireless communications network is decreased.

A yet further advantage according to embodiments herein is that they may make the handover to trigger early when the signals from the primary cell worsen rapidly, to avoid bad signal quality, as detected by a first threshold, and at the same time make sure that there is a relative improvement before the event is triggered, as controlled by the difference of a second threshold minus a first threshold for the first event. This may in turn increase handover performance in interfered and high speed wireless device scenarios, without sacrificing performance in low loaded scenarios, where the second event will be triggered when the entering condition for this event is fulfilled.

As a consequence of the self-adapting properties of embodiments herein, it is yet a further advantage of embodiments herein, that tuning of network and handover parameters may be less needed.

A yet further advantage according to embodiments herein is that the early trigger allows the nominal relative threshold, i.e., the A3 offset, to be set larger without major drawback, i.e., dropped calls, and that will decrease the amount of handover. Thus, the overall efficiency of the wireless communications network may be increased.

A yet further advantage according to embodiments herein is that they allow that a larger nominal Cell individual offset may be used to allow traffic to be served by a cell with low output power "Cell range expansion", without getting quality degradation to a significant extent, since handover will be done when really needed.

A yet further advantage according to embodiments herein is that if a nominal offset is used, embodiments herein may improve the handover success rate by using less offset but only when motivated by poor signal quality. That is, the handover failure rate may decrease, and thus, the user's satisfaction may be increased.

A yet further advantage according to embodiments herein is that cell range expansion may be allowed when possible, but may self-adjust to not using cell range expansion when it is not possible due to downlink interference.

A yet further advantage according to embodiments herein is that more freedom is allowed in the compromise between using large handover offset to reduce the number of handovers and not getting a corresponding increase in handover failures. That is, a degradation of throughput may be avoided.

Figure 2:
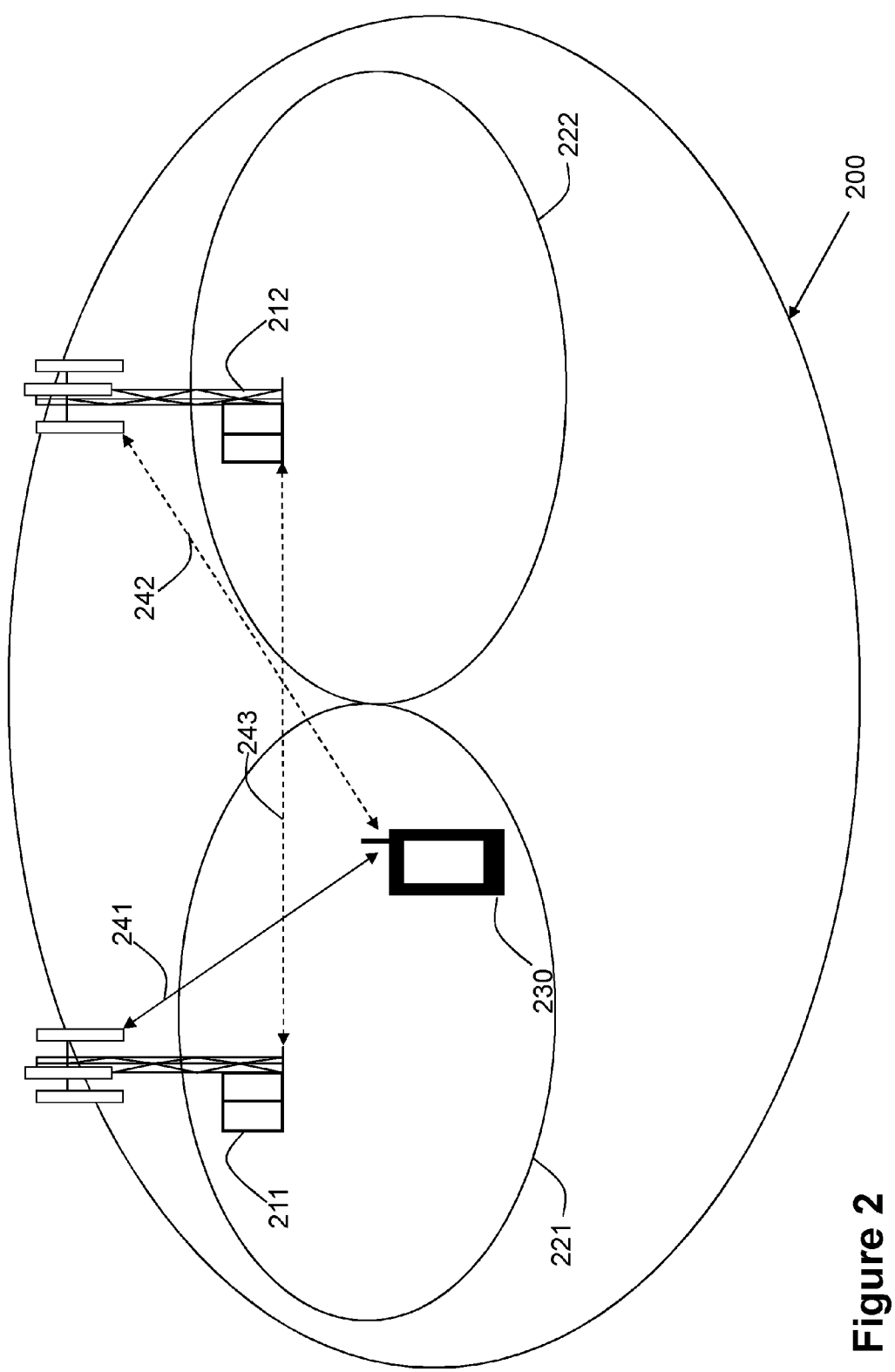
FIG. 2 is a schematic block diagram illustrating embodiments in a wireless communications system.

FIG. 2 depicts a wireless communications network 200, in which embodiments herein may be implemented. The wireless communications network 200 is a wireless communication network such as an LTE, a Code Division Multiple Access (CDMA) network, a Wideband Code Division Multiple Access (WCDMA) Global System for Mobile Communications (GSM) network, any 3GPP cellular network, any 3GPP2 cellular network, a Worldwide Interoperability for Microwave Access (WiMAX) network, a WiFi network, or any wireless network or system.

Wireless communications network 200 may be a heterogeneous network, or a homogeneous network.

The wireless communications network 200 comprises a primary network node 211 and a neighbour network node 212. Each of the primary network node 211 and neighbour network node 212 may be a base station such as e.g. an eNB, eNodeB, or a Home Node B, a Home eNode B, femto Base Station, BS, pico BS or any other network unit capable to serve a wireless device or a machine type communication device in a wireless communications network 200. In some particular embodiments, primary network node 211 or neighbour network node 212 may be a stationary relay node or a mobile relay node. The wireless network 200 covers a geographical area which is divided into cell areas, wherein each cell area is served by a network node, although, one network node may serve one or several cells. In the example depicted in FIG. 2, the primary network node 211 serves a primary cell 221, and the neighbour network node 212 serves a neighbour cell 222. However, in some particular embodiments not depicted in FIG. 2, the primary network node 211 may be the same as the neighbour network node 212, so that the primary cell 221 and the neighbour cell 222 may both be served by the same network node 211, 212. Each of the primary network node 211 and neighbour network node 212 may be of different classes such as e.g. macro eNodeB, home eNodeB or pico base station, based on transmission power and thereby also cell size. In some embodiments, the neighbour cell 222 may be on the same frequency as the primary cell 221. In other embodiments, the neighbour cell 222 may be on a different frequency than the primary cell 221. Typically, wireless communications network 200 may comprise more cells similar to 221 and 222, served by their respective network nodes. This is not depicted in FIG. 2 for the sake of simplicity. Each of the primary network node 211 and neighbour network node 212 may support one or several communication technologies, and its name may depend on the technology and terminology used. In 3GPP LTE, network nodes, which may be referred to as eNodeBs or even eNBs, may be directly connected to one or more core networks. The primary network node 211 and the neighbour network node 212 may communicate with each other via a link 241.

A number of wireless devices are located in the wireless communications network 200. In the example scenario of FIG. 2, only one wireless device is shown, wireless device 230. The wireless device 230 may e.g. communicate with the primary network node 211 over a radio link 242 and communicate with the neighbour network node 212 over a radio link 243.

The wireless device 230 is a wireless communication device such as a user equipment (UE), which is also known as e.g. mobile terminal, wireless terminal and/or mobile station. The device is wireless, i.e., it is enabled to communicate wirelessly in the wireless communication network 200, sometimes also referred to as a cellular radio system or cellular network. The communication may be performed e.g., between two devices, between a device and a regular telephone and/or between a device and a server. The communication may be performed e.g., via a Radio Access Network (RAN) and possibly one or more core networks, comprised within the wireless network.

The wireless device 230 may further be referred to as a mobile telephone, cellular telephone, or laptop with wireless capability, just to mention some further examples. The device 230 in the present context may be, for example, portable, pocket-storable, hand-held, computer-comprised, or vehicle-mounted mobile devices, enabled to communicate voice and/or data, via the RAN, with another entity, such as a server, a laptop, a Personal Digital Assistant (PDA), or a tablet computer, sometimes referred to as a surf plate with wireless capability, Machine-to-Machine (M2M) devices, devices equipped with a wireless interface, such as a printer or a file storage device or any other radio network unit capable of communicating over a radio link in a cellular communications system.

Figure 3:
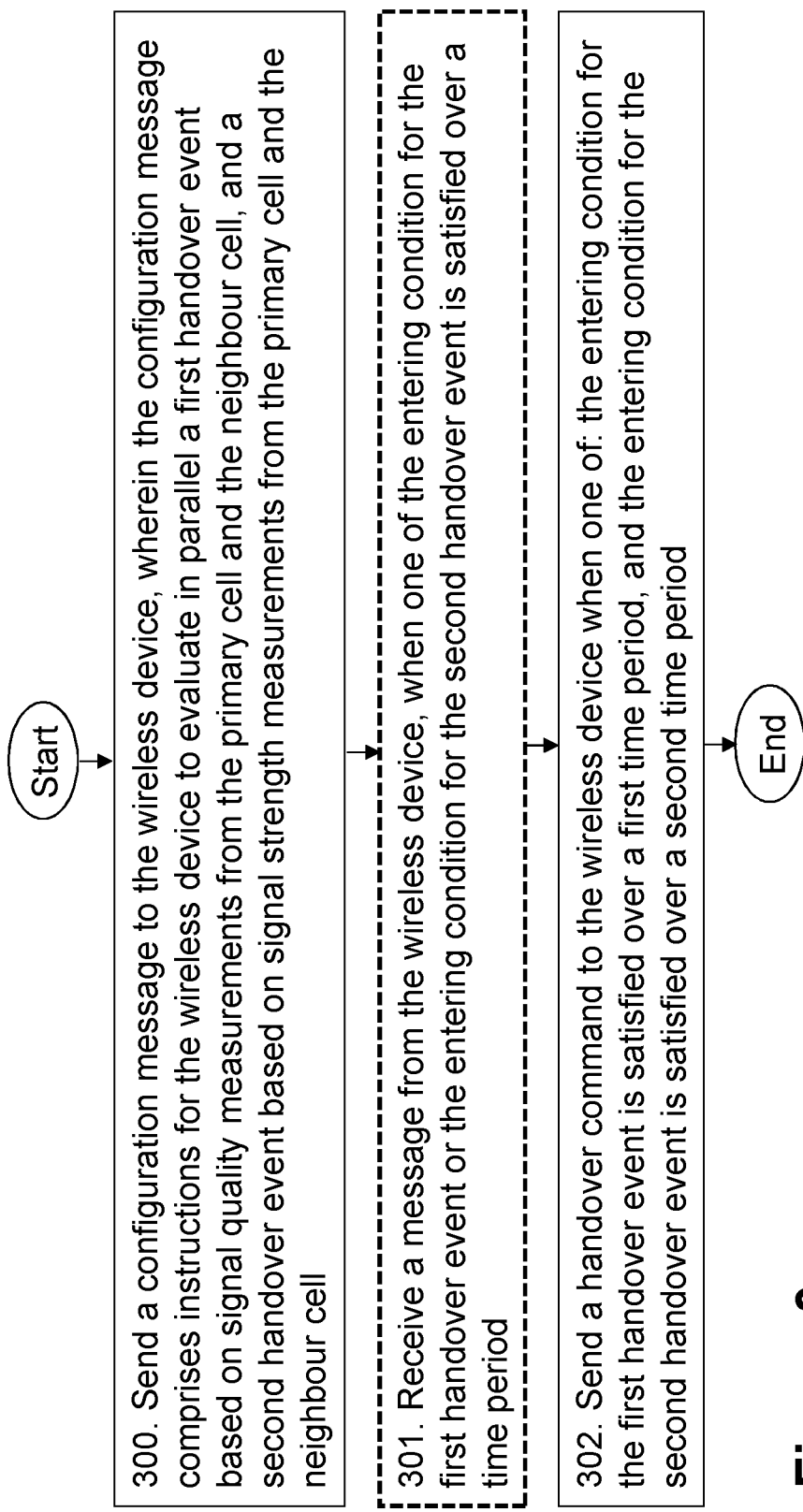
FIG. 3 is a flowchart depicting embodiments of a method in a primary network node.
Figure 4:
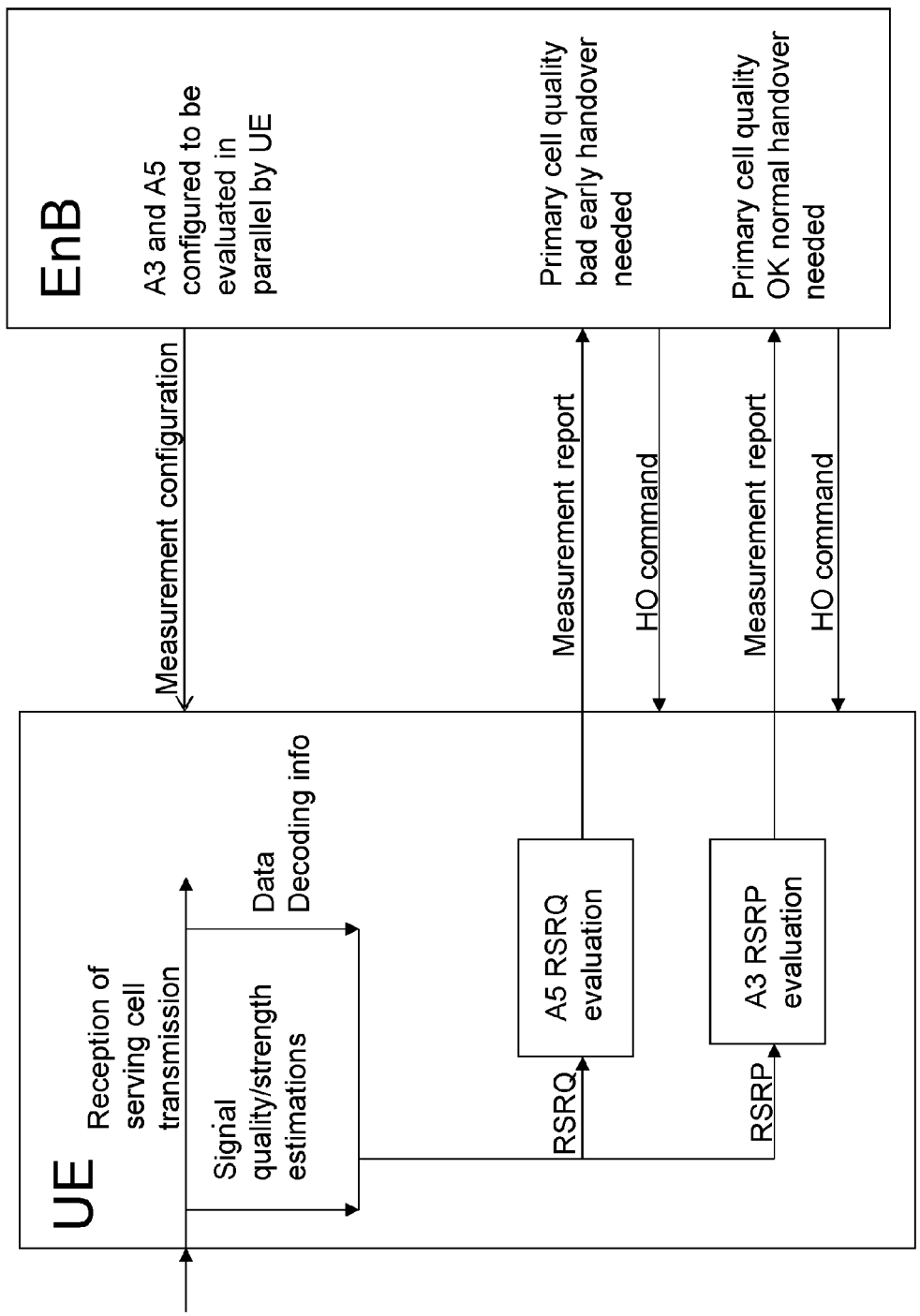
FIG. 4 is a schematic block diagram illustrating embodiments of a handover event in a wireless communications system.
Figure 5A:
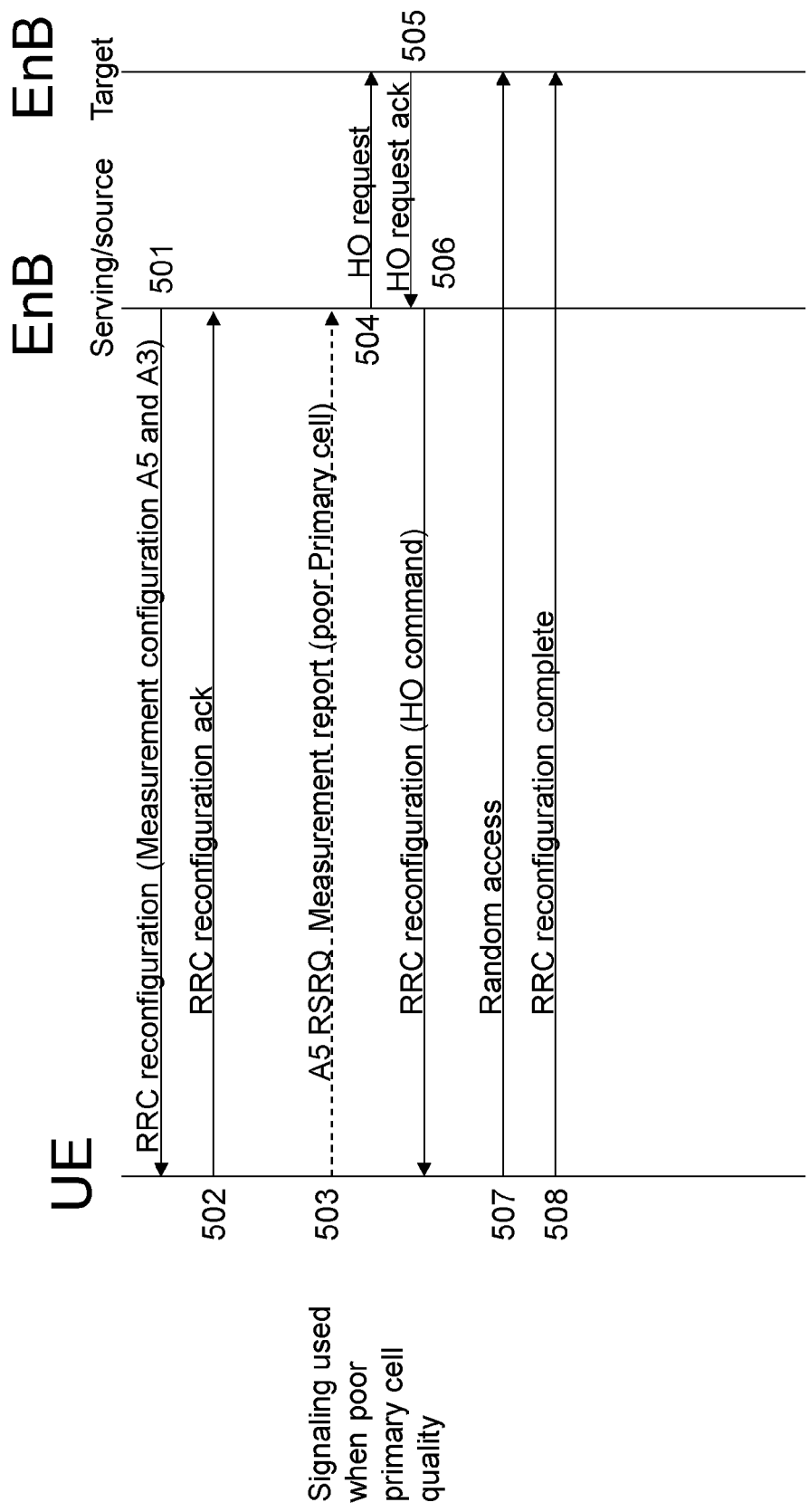
FIG. 5a is a schematic block diagram illustrating embodiments of a handover event in a wireless communications system.
Figure 5B:
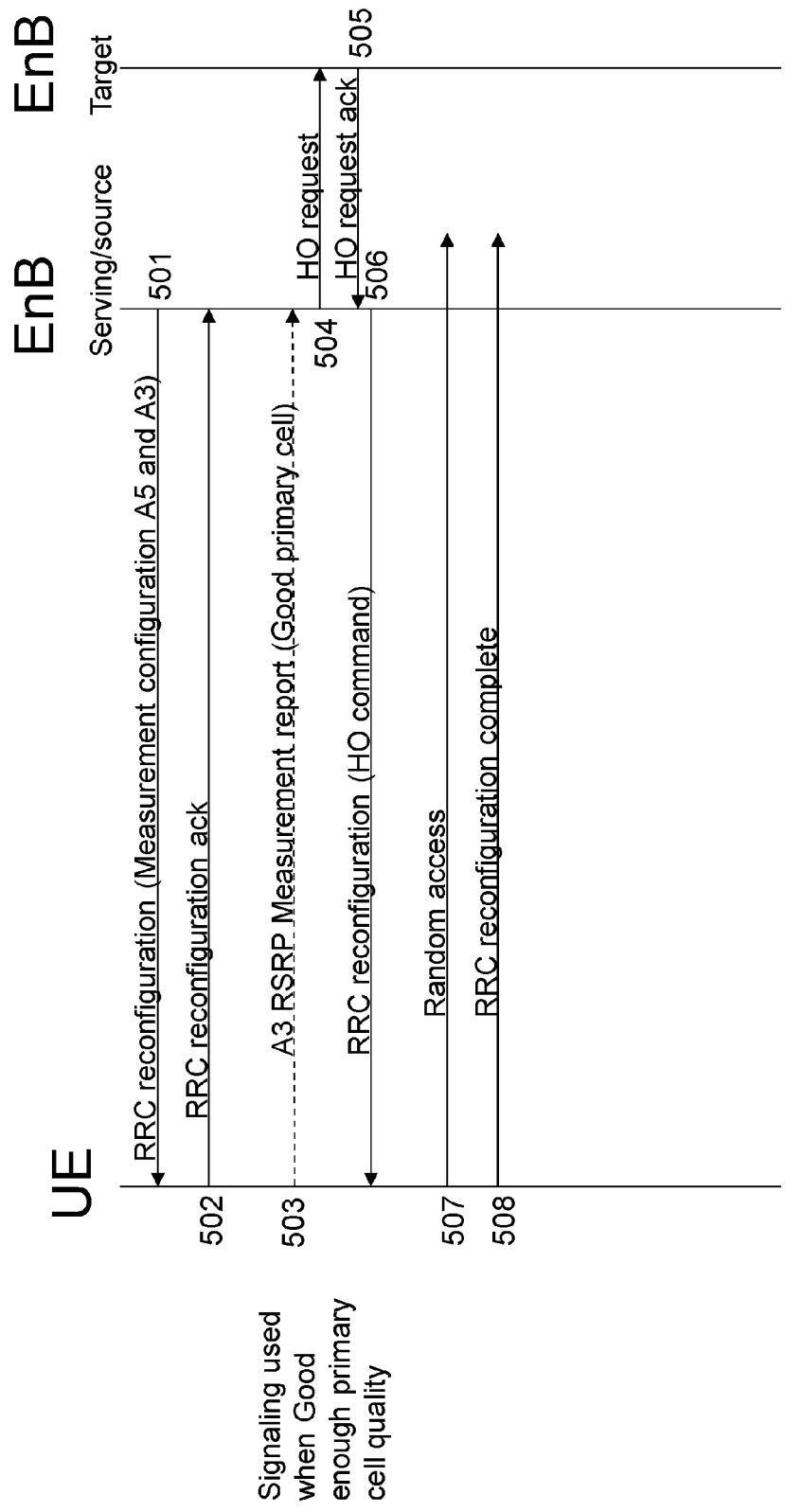
FIG. 5b is a schematic block diagram illustrating embodiments of a handover event in a wireless communications system.

Embodiments of a method in the primary network node 211 for handling a handover of the wireless device 230 from the primary cell 221 to the neighbour cell 222 will now be described with reference to the flowchart depicted in FIG. 3, the schematic diagrams in FIG. 4, FIGS. 5a-b, and FIG. 6. FIG. 3 depicts a flowchart of the actions that are or may be performed by the primary network node 211 in embodiments herein. Discontinued lines depict optional actions. A continuous line depicts a mandatory action. FIG. 4 depicts a summarized schematic diagram of an example of the actions that may be performed by the primary network node 211, which is represented in the embodiment of this Figure as EnB, in relation to its communications with the wireless device 230, represented here as UE. FIGS. 5a-b are summarized schematic diagrams of examples of the communications that may occur in embodiments herein, between wireless device 230, which is represented in the embodiment of these Figures as UE, primary network node 211, which is represented in the embodiment of these Figures as EnB serving/source, and the neighbour network node 212, which is represented in the embodiment of these Figures as EnB Target. As mentioned above, the primary cell 221 is serviced by the primary network node 211, the neighbour cell 222 is serviced by a neighbour network node 212, and the wireless device 230, the primary network node 211, the primary cell 221, the neighbour network node 212 and the neighbour cell 222 are comprised in a wireless communications network 200.

The method comprises the following actions, which actions may as well be carried out in another suitable order than that described below. In some embodiments, all the actions may be carried out, whereas in other embodiments only some action/s may be carried out.

Action 300

In this action, as depicted in FIGS. 4 and 5a-b, the primary network node 211 sends a configuration message to the wireless device 230. The configuration message comprises instructions for the wireless device 230 to evaluate in parallel a first handover event and a second handover event, for the reasons discussed above. The first handover event is based on signal quality measurements from the primary cell 221 and the neighbour cell 222. The second handover event is based on signal strength measurements from the primary cell 221 and the neighbour cell 222. To evaluate comprises determining if an entering condition for the first handover event is satisfied and if an entering condition for the second handover event is satisfied.

In some embodiments, the primary network node 211 may send the configuration message to the wireless device 230 when wireless device 230 starts a connection with the primary network node 211.

In some particular embodiments, the configuration message may be a Radio Resource Control (RRC) message comprising a reconfiguration. In some particular embodiments, the primary network node 211 may send the configuration message to the wireless device 230 when an RRC connection is setup for evaluating Intra frequency objects.

In some embodiments, determining if the entering condition for the first handover event is satisfied comprises determining if a first entering precondition and a second entering precondition are fulfilled. The first entering precondition may be based on a comparison of a measurement of signal quality from the primary cell 221 with a first threshold. The second entering precondition may be based on a comparison of a measurement of signal quality from the neighbour cell 222 with a second threshold.

Determining if the entering condition for the second handover event is satisfied may comprise a comparison of a measurement of signal strength from the primary cell 221 with a measurement of signal strength from the neighbour cell 222 and an offset.

The first and second thresholds, which may be typically set by the operator of the wireless communications network 200, represent a value above which signal quality is good, and below which, signal quality is bad to guarantee a good communication with the wireless device 230. For example, the first threshold may be set to =−15 dB.

In some embodiments, the second threshold may be set to be larger than the first threshold, where the difference between the first threshold and the second threshold is chosen to give a reduced handover margin as compared to the second handover event, e.g. an A3 event, if the first handover event, e.g., an A5 event, is triggered. For example, the second threshold may be set to −14 dB.

The offset, which may be typically set by the operator of the wireless communications network 200, sets the value of the difference between the signal strength of the primary and neighbour cells, 221 and 222, respectively, above which, the signal strength of the neighbour cell 222 is considered to be sufficiently better than that of the primary cell 221, to justify a handover.

In some embodiments, the offset is set to avoid ping pong handovers or too late handover. In some embodiments, the difference of the second threshold minus the first threshold is smaller than the offset, which in some embodiments is an A3 offset. This may be done to trigger handover earlier when the signal quality in the primary cell 221 is bad to guarantee a good communication with the wireless device 230. For example, the offset may be set to 3 dB.

In some embodiments, the configuration message may further configure the wireless device 230 to measure any of: the signal strength from the neighbour cell 222, the signal strength from the primary cell 221, the signal quality from the primary cell 221, and the signal strength from the neighbour cell 222.

In some embodiments, the first entering precondition is further based on a first hysteresis parameter, and the second entering precondition is further based on at least one of: a first frequency specific offset of a frequency of the neighbour cell 222, a first cell specific offset of the neighbour cell 222, and the first hysteresis parameter. The comparison comprised in the entering condition for the second handover event may further comprise at least one of: a second frequency specific offset of a frequency of the neighbour cell 222, a second cell specific offset of the neighbour cell 222, a second hysteresis parameter, a frequency specific offset of a frequency of the primary cell 221 and a cell specific offset of the primary cell 221.

In some particular embodiments, the first entering precondition is:

$Mp+Hys<\text{Thresh1}$, the second entering precondition is:

$Mn+Ofn+Ocn-Hys>\text{Thresh2}$; and the entering condition for the second handover event is:

$Mn+Ofn+Ocn-Hys>Mp+Ofp+Ocp+\text{Off}$,

In these embodiments:

Mn is the measurement of signal quality from the neighbour cell 222 in the second entering precondition for the first handover event, and is the measurement of signal strength from the neighbour cell 222 in the entering condition for the second handover event. In some embodiments, and for either of the events, Mn does not take into account any offsets;

Ofn is the first frequency specific offset of the frequency of the neighbour cell 222 in the second entering precondition for the first handover event, and is the second frequency specific offset of the frequency of the neighbour cell 222 in the entering condition for the second handover event. In some embodiments, and for either of the events, Ofn is offsetFreq as defined within measObjectEUTRA corresponding to the frequency of the neighbour cell 222;

Ocn is the first cell specific offset of the neighbour cell 222 in the second entering precondition for the first handover event, and is the second cell specific offset of the neighbour cell 222 in the entering condition for the second handover event, wherein Ocn is set to zero when configured for a cell that is not the neighbour cell 222. In some embodiments, and for either of the events, Ocn is cellIndividualOffset as defined within measObjectEUTRA corresponding to the frequency of the neighbour cell 222. In some further embodiments, and for either of the events, Ocn is set to zero if not configured for the neighbour cell 222;

Mp is the measurement of signal quality from the primary cell 221 in the first entering precondition for the first handover event, and the measurement of signal strength from the primary cell 221 in the entering condition for the second handover event. In some embodiments, and for either of the events, Mp does not take into account any offsets;

Ofp is the frequency specific offset of the primary frequency of the primary cell 221. In some embodiments, Ofp is offsetFreq as defined within measObjectEUTRA corresponding to the frequency of the primary cell 221;

Ocp is the cell specific offset of the primary cell 221, and is set to zero when configured for a cell that is not the primary cell 221. In some embodiments, Ocp is cellIndividualOffset as defined within measObjectEUTRA corresponding to the frequency of the primary cell 221. In some further embodiments, Ocp is set to zero if not configured for the primary cell 221;

Hys is the first hysteresis parameter in the first handover event and is the second hysteresis parameter in the second handover event. In some embodiments, and for either of the events, Hys is hysteresis as defined within reportConfigEUTRA for the corresponding event;

Off is the offset parameter in each of the first handover event and the second handover event. In some embodiments, and for either of the events, Off is a3-Offset as defined within reportConfigEUTRA for the corresponding event;

Thresh1 is the threshold parameter for the first entering precondition for the first handover event. In some embodiments, Thresh1 is a5-Threshold1 as defined within reportConfigEUTRA for the A5 event;

Thresh2 is the threshold parameter for the second entering precondition for the first handover event. In some embodiments, Thresh2 is a5-Threshold2 as defined within reportConfigEUTRA for the A5 event;

Thresh1 is expressed in the same unit as Mp in the first entering precondition for the first handover event, and Thresh2 is expressed in the same unit as Mn in the second entering precondition for the first handover event.

In some embodiments, the parameters just described for the entering condition for the first handover event and the entering condition for the second handover event correspond to those described in 3GPP TS 36.331, Evolved Universal Terrestrial Radio Access (E-UTRA); Radio Resource Control (RRC); Protocol specification.

Thus, in some embodiments, the primary cell 221 may be referred to as the PCell.

In some embodiments, the cell(s) that triggers the first handover event is on the frequency indicated in the associated measObject, which may be different from the (primary) frequency used by the primary cell 221.

In some embodiments, the cell(s) that triggers the second handover event is on the frequency indicated in the associated measObject, which may be different from the (primary) frequency used by the primary cell 221.

In some embodiments, Mn and Mp are expressed in dBm when they represent a measurement of signal strength, such as in case of RSRP, or in dB when they represent a measurement of signal quality, such as in case of RSRQ.

In some embodiments, Ofn, Ocn, Ofp, Ocp, Hys, and Off are expressed in dB.

In some typical embodiments, Ofn, Ocn, Ofp, Ocp are set to 0.

In some typical embodiments, Thresh1 and Thresh2 are the parameters used by the primary network node 211 to control the first handover event.

In some typical embodiments, Off is the parameter used by the primary network node 211 to control the second handover event.

The configuration message from the primary network node 211 may also comprise a time to trigger configuration for each of the first handover event and the second handover event. That is, a configuration for the first time period, and for the second time period, respectively. Each of the time periods sets the length of time that each of the entering condition for the first handover event, and the entering condition for the second handover event have to last, in order to trigger sending a message to the primary network node 211, such as a message comprising a measurement report. The first time period and the second time period may be set according to best practice. In some embodiments this may be, for example, 40 ms.

The hysteresis parameter for each one of the first handover event and the second handover event may be set according to best practice. In some embodiments this may be, for example, 1 dB.

The L3 filtering may also be set according to best practice. For example, filtercoefficient may be set to 4 for a signal strength measurement, such as RSRP, and may be slightly higher for a signal quality measurement, such as RSRQ to filter out variations due to primary cell 221 and neighbour cell 222 data transmissions. For example, the hysteresis parameter may be set to 1 dB and either one of the first time period and the second time period may be set to 40 ms.

As stated earlier, in some embodiments, the primary network node 211 is the same as the neighbour network node 212.

In some embodiments, at least one of the measurement of signal strength from the primary cell 221 and the measurement of signal strength from the neighbour cell 222 is a Reference Signal Received Power RSRP.

In some embodiments, at least one of the measurement of signal quality from the primary cell 221 and measurement of signal quality from the neighbour cell 222 is a Reference Signal Received Quality RSRQ or a Signal to Interference and Noise Ratio SINR. In some embodiments, the signal quality from the primary cell 221, e.g., the RSRQ, may not be layer3 filtered. In other embodiments, the signal quality from the primary cell 221 may be a Channel Quality Indicator (CQI), Physical Downlink Control CHannel Block Error Rate (PDCCH BLER), soft information from data decoding, or similar signal quality indicators that will be known by one of skill in the art, and well as a combination of any of these quality signals.

In some embodiments, the configuration message may further comprise instructions for the wireless device 230 to evaluate a leaving condition for the first handover event, and a leaving condition for the first handover event, as described below. In some embodiments, these conditions correspond, respectively, to the leaving conditions for the A5 and A3 events, as described in 3GPP TS 36.331, Evolved Universal Terrestrial Radio Access (E-UTRA); Radio Resource Control (RRC); Protocol specification.

In some further particular embodiments, the primary network node 211 may receive a first acknowledgement message back from the wireless device 230 acknowledging the reception of the configuration message, as shown in FIGS. 5a-b.

Action 301

In this action, the primary network node 211 may receive a message from the wireless device 230, when one of: the entering condition for the first handover event is satisfied over the first time period, as described earlier, and the entering condition for the second handover event is satisfied over the second time period, as described earlier, wherein the message comprises a measurement report.

Figure 6:
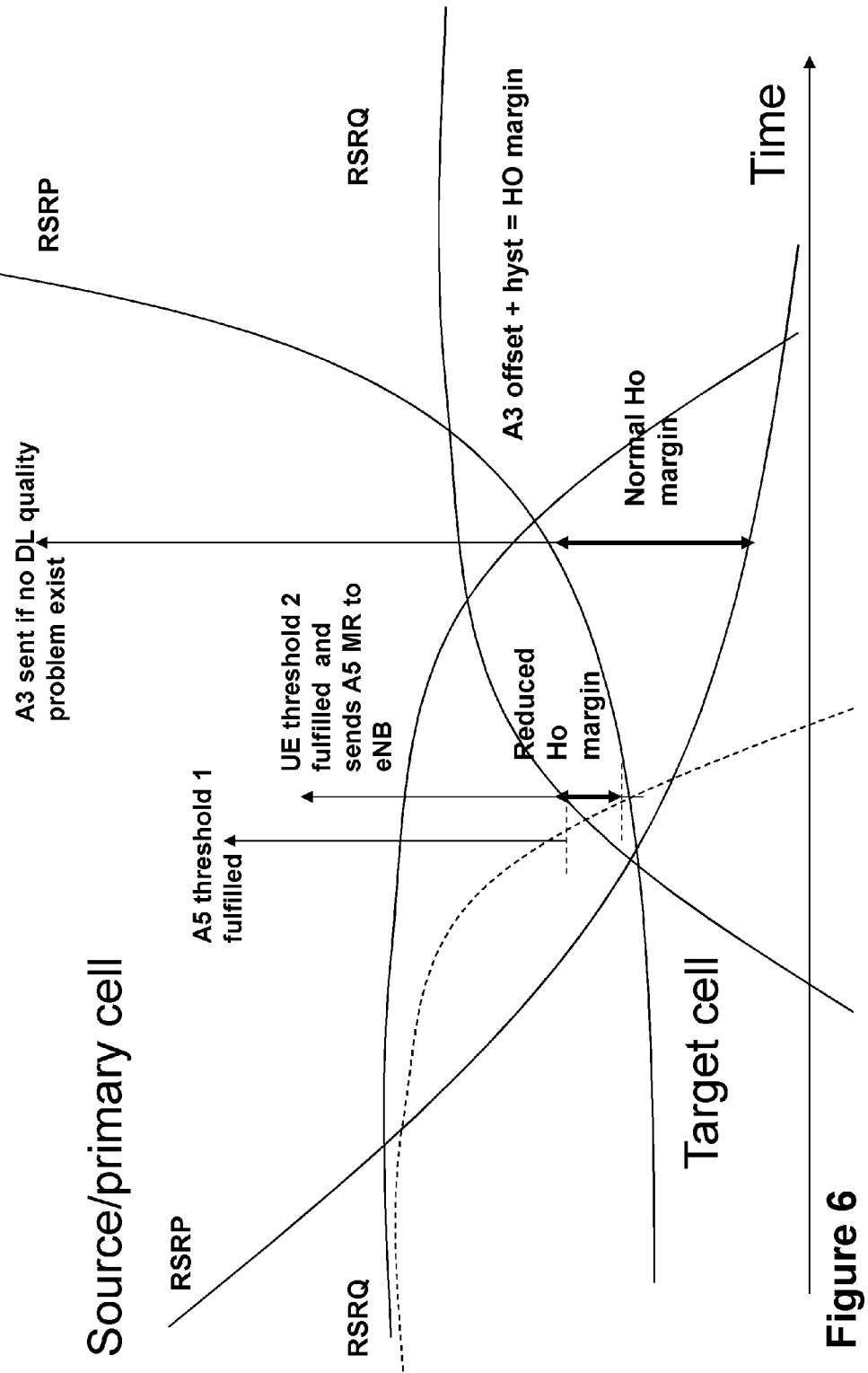
FIG. 6 is a schematic diagram illustrating embodiments of a handover event in a wireless communications system.

In some embodiments, this action may be referred to as a reception of an A5 measurement report when the entering condition for the first handover event is satisfied over a first time period, and a reception of an A3 measurement report when the entering condition for the second handover event is satisfied over a second time period. This is in reference to the handover events existing in current specifications, such as the 3GPP TS 36.331, ch. 5.5, Evolved Universal Terrestrial Radio Access (E-UTRA); Radio Resource Control (RRC); Protocol specification. An example of such an embodiment is illustrated in FIG. 6. In this Figure, the primary cell 221 is represented as Source/primary cell, the primary network node 211 is referred to as EnB, the neighbour cell 222 is represented as Target cell, and the wireless device 230 is referred to as UE. In this example, the measurement of signal strength from the primary cell 221, and the measurement of signal strength from the neighbour cell 222 is RSRP, while the measurement of signal quality from the primary cell 221 and measurement of signal quality from the neighbour cell 222 is RSRQ. As FIG. 6 shows, when the primary cell 221 becomes worse than a the first threshold of the A5 event, i.e., threshold 1, and the neighbour cell 222 becomes better than the second threshold of the A5 event, i.e., threshold 2, based on RSRQ measurements, the wireless device 230 sends an A5 measurement report, i.e., MR, to the primary network node 211. If no downlink quality problems exist, when the neighbour cell 222 becomes offset better than the primary cell 221, in terms of RSRP measurements, the wireless device 230 sends an A3 measurement report, i.e., MR, to the primary network node 211. If the primary network node 211, receives a measurement report from either event, e.g. A5 or A3, a handover process is started. Also as shown, the difference of the second threshold minus the first threshold of this A5 event is smaller than the offset of the A3 event. This is done to give a reduced handover (HO) margin as compared to the second handover event. The offset for the second handover event, i.e., A3, is set to the same value as before the extra first event, i.e., A5, was used. As shown, the handover margin is equal to the A3 offset plus the second hysteresis parameter, represented here as hyst.

In some embodiments, the entering condition for the first handover event is satisfied over the first time period if a leaving condition for the first handover event, as described below is not satisfied during the first time period. In some embodiments, the entering condition for the second handover event is satisfied over the second time period if a leaving condition for the second handover event, as described below, is not satisfied during the second time period.

In response to this action 301, the primary network node 211 may send a handover request message to the neighbour network node 212 which may comprise a handover request, as depicted in FIGS. 5a-b, and as described, for example, in the specification just cited.

Action 302

In this action, the primary network node 211 sends a handover command to the wireless device 230 when one of: the entering condition for the first handover event is satisfied over the first time period, and the entering condition for the second handover event is satisfied over the second time period, as depicted in FIGS. 3, 4 and 5a-b.

In some embodiments, this may happen once a second acknowledgement message from the neighbour network node 212 is received, comprising for example, an acknowledgement of the handover request and configuration information, as shown in FIGS. 5a-b.

In some embodiments, the handover command sent by the primary network node 211 may be an RRC reconfiguration message, as depicted in the example of FIGS. 5a-b.

In some embodiments, the handover event may be an intrafrequency handover event.

In some embodiments, the handover event may be an interfrequency handover event. In these embodiments, the parameter settings for the first handover event and the second handover event will typically be different. For example, the Thresh2−Thresh1 difference may be required to be larger, and the offset of the second handover event may be larger, to avoid interfrequency handover in favour of intrafrequency handover.

In the particular embodiments in which the primary cell 221 and neighbour cell 222 may be both served by the same primary network node 211, the handover request signalling is not needed. In some embodiments, the primary network node 211 may transmit the handover command also via the neighbour cell 222, instead of or in addition to the primary cell 221.

Embodiments of a method in the wireless communications network 200 for handling a handover of a wireless device 230 from a primary cell 221 to a neighbour cell 222 will now be described with reference to the schematic block diagram depicted in FIG. 4 and FIGS. 5a-b, and the schematic diagram depicted in FIG. 6. FIG. 4 depicts a summarized schematic block diagram of an example of the actions that may be performed in the wireless communications network 200 by the primary network node 211, which is represented in the embodiment of this Figure as EnB, in relation to its communications with the wireless device 230, represented here as UE. FIGS. 5a-b are summarized schematic diagrams of examples of the communications that may occur in embodiments herein, between wireless device 230, which is represented in the embodiment of these Figures as UE, primary network node 211, which is represented in the embodiment of these Figures as EnB serving/source, and neighbour network node 212, which is represented in the embodiment of these Figures as EnB Target. As mentioned above, the primary cell 221 is serviced by the primary network node 211, the neighbour cell 222 is serviced by a neighbour network node 212, and the wireless device 230, the primary network node 211, the primary cell 221, the neighbour network node 212 and the neighbour cell 222 are comprised in the wireless communications network 200.

The method comprises the following actions, which actions may as well be carried out in another suitable order than that described below. In some embodiments, all the actions may be carried out, whereas in other embodiments only some action/s may be carried out.

Action 501

As depicted in FIGS. 4 and 5a-b, the primary network node 211 sends the configuration message to the wireless device 230. The configuration message comprises instructions for the wireless device 230 to evaluate in parallel the first handover event and the second handover event. The first handover event is based on signal quality measurements from the primary cell 221 and the neighbour cell 222. The second handover event is based on signal strength measurements from the primary cell 221 and the neighbour cell 222. To evaluate comprises determining if the entering condition for the first handover event is satisfied and if the entering condition for the second handover event is satisfied, as described above in action 300.

In some embodiments, the primary network node 211 sends the configuration message to the wireless device 230 when wireless device 230 starts the connection with the primary network node 211.

The details of how this action may take place in different embodiments are the same as those described before in action 300, and will therefore not be repeated here.

Action 502

In some embodiments, the wireless device 230 receives the configuration message sent by the primary network node 211. In some particular embodiments, the wireless device 230 acknowledges having received the configuration message sent by the primary network node 211 by sending the first acknowledgement message to the primary network node 211. In some particular embodiments, the first acknowledgement message sent by the wireless device 230 to acknowledge having received the configuration message from the primary network node 211 is an RRC message comprising a reconfiguration acknowledgement.

Pursuant to the instructions comprised in the configuration message received from the primary network node 211, in this action, the wireless device 230 may evaluate in parallel the first handover event and the second handover event. This may comprise monitoring reception information received from the primary cell 221 and the neighbour cell 222. In some particular embodiments, the reception information received from the primary cell 221 may be Cell-specific Reference Signals (CRS) as described in the 3GPP TS 36.211 V10.6.0 (2012-12) specification.

In some particular embodiments, the wireless device 230 may measure at least one of: the signal strength from the primary cell 221, the signal strength from the neighbour cell 222, the signal quality from the primary cell 221 and the signal quality from the neighbour cell 222. In some embodiments, the wireless device 230 may measure by recording raw data. In other embodiments, measuring may comprise estimating at least one of: the signal strength from the primary cell 221, the signal strength from the neighbour cell 222, the signal quality from the primary cell 221 and the signal quality from the neighbour cell 222. In these embodiments, estimating comprises collecting additional available and relevant information to enhance the accuracy of the recorded data. For example, additional available and relevant information may be information about the speed of the wireless device 230, Block Error, soft info from receiver, retransmission success rate, power used, geographical position, node configuration, and statistical analysis of data collected. The manner in which this may be implemented is similar to that described in, for example, the 3GPP specification: TS 36.214 Evolved Universal Terrestrial Radio Access (E-UTRA); Physical layer; Measurements.

As described above, in some embodiments in this or any other action described herein, the signal strength from the neighbour cell 222 and the signal strength from the primary cell 221 may be a Reference Signal Received Power RSRP.

In some embodiments in this or any other action described herein, the signal quality from the primary cell 221 and the signal quality from the neighbour cell 222 may be a Reference Signal Received Quality RSRQ or a Signal to Interference Noise Ratio SINR. In some embodiments, the signal quality from the primary cell 221 and the signal quality from the neighbour cell 222, e.g., the RSRQ, may not be layer3 filtered. In other embodiments, the signal quality from the primary cell 221 and the signal quality from the neighbour cell 222 may be a Channel Quality Indicator (CQI), Physical Downlink Control CHannel Block Error Rate (PDCCH BLER), soft information from data decoding, or similar signal quality indicators that will be known by one of skill in the art, and well as a combination of any of these quality signals.

Action 503

In this action, the wireless device 230 sends the message described above in action 301 to the primary network node 211, when one of: the entering condition for the first handover event is satisfied over the first time period, as described earlier, and the entering condition for the second handover event is satisfied over the second time period, as described earlier. The message comprises a measurement report. An example of how this may be done may be found, for example, in 3GPP TS 36.200.

In some embodiments, each of the first time period and the second time period may be a time to trigger, as described above.

In some particular embodiments, the wireless device 230 may determine if a leaving condition for the first handover event is satisfied by determining if a first leaving precondition or a second leaving precondition is fulfilled. This is optional.

The first leaving precondition may be based on the measurement of signal quality from the primary cell 221. And the second leaving precondition may be based on the measurement of signal quality from the neighbour cell 222.

In some particular embodiments, the wireless device 230 may also determine if a leaving condition for the second handover event is satisfied, the leaving condition for the second handover event being based a measurement of signal strength from the primary cell 221, and a measurement of signal strength from the neighbour cell 222.

In some embodiments, the first leaving precondition may be further based on the first hysteresis parameter.

In some embodiments, the second leaving precondition may be further based on at least one of: the frequency specific offset of a frequency of the neighbour cell 222, the cell specific offset of the neighbour cell 222, and the first hysteresis parameter.

In some embodiments, the leaving condition for the second handover event is further based on the frequency specific offset of the frequency of the neighbour cell 222, the cell specific offset of the neighbour cell 222, the second hysteresis parameter, a frequency specific offset of a frequency of the primary cell 221, the cell specific offset of the primary cell 221 and the offset parameter.

In some particular embodiments, the first leaving precondition may be:

$$Mp-Hys<\text{Thresh1},$$

the second leaving precondition may be:

$$Mn+Ofn+Ocn+Hys>\text{Thresh2}$$

and the leaving condition for the second handover event may be:

$$Mn+Ofn+Ocn+Hys>Mp+Ofp+Ocp+\text{Off},$$

wherein each of these variables corresponds to those described for action 300.

In the embodiments in which either the leaving condition for the first handover event is satisfied, or the leaving condition for the second handover event is satisfied, as determined in this action, over the first time period, e.g., a time to trigger or TTT, or the second time period, respectively, the wireless device 230 may reset a time period timer which keeps track of the time period and/or the second time period. In some embodiments, the first time period for satisfying the leaving condition for the first handover event may be different from the first time period for satisfying the entering condition for the first handover event. Similarly, the second time period for satisfying the leaving condition for the second handover event may be different a different value than the second time period for satisfying the entering condition for the second handover event.

In the embodiments in which either the leaving condition for the first handover event or the leaving condition for the second handover event is satisfied over the time period or the second time period, the wireless device 230 may also send a second message to one or both of: the primary network node 211 and the neighbour network node 212. The second message may comprise a second measurement report for reporting the cancelling of the first handover event or the second handover event, respectively.

Action 504

In some embodiments, the primary network node 211 receives the message sent by the wireless device 230 in action 503.

In response to this action, the primary network node 211 may send the handover request message to the neighbour network node 212 comprising a handover request, as depicted in FIGS. 5a-b, and as described above in action 301. In the particular embodiments in which the primary cell 221 and neighbour cell 222 may be both served by the same primary network node 211, the handover request signalling is not needed.

Action 505

In some embodiments, the neighbour network node 212 receives the handover request message comprising the handover request from the primary network node 211.

In this action, the neighbour network node 212 may then respond by sending a second acknowledgement message to the primary network node 211, the second acknowledgement message comprising a handover request acknowledgement.

Action 506

In some embodiments, the primary network node 211 receives the second acknowledgement message comprising the handover request acknowledgement from the neighbour network node 212.

In this action, the primary network node 211 sends the handover command to the wireless device 230 after receiving the message from the wireless device 230 comprising the measurement report, as described above in action 302. In some particular embodiments, this will also be after the primary network node 211 receives the second acknowledgement message comprising the handover request acknowledgement from the neighbour network node 212.

In some embodiments, the primary network node 211 may transmit the handover command also via the neighbour cell 222, instead of or in addition to the primary cell 221, as explained above.

Action 507

In some embodiments, the wireless device 230 may receive the handover command from the primary network node 211. After having received the handover command from the primary network node 211, the wireless device 230 may execute the handover. In some particular embodiments the wireless device 230 will execute the handover by sending a random access message to the neighbour network node 212. In some of these embodiments, by executing the handover, the wireless device 230 will stop listening to the primary cell 221 and retune to the neighbour cell 222, and will make handover access to the neighbour cell 222.

Action 508

The neighbouring network node 212 may grant access to the wireless device 230. Once the wireless device 230 is granted access to the neighbouring node 212, which in some embodiments may comprise receiving an access grant message from the neighbouring node 212 comprising an access grant, the wireless device may send a reconfiguration message to the neighbour network node 212 comprising a reconfiguration complete message. In some embodiments, this message comprising a reconfiguration complete message may be an RRC reconfiguration complete message.

To perform the method actions in the primary network node 211 described above in relation to FIGS. 3-6 for handling a handover of a wireless device 230 from a primary cell 221 to a neighbour cell 222, the primary network node 211 comprises the following arrangement depicted in FIG. 7, and as described below. As mentioned above, the primary cell 221 is serviced by the primary network node 211, the neighbour cell 222 is serviced by a neighbour network node 212, and the wireless device 230, the primary network node 211, the primary cell 221, the neighbour network node 212 and the neighbour cell 222 are comprised in a wireless communications network 200.

The primary network node 211 comprises a sending circuit 701 configured to send the configuration message to the wireless device 230. The configuration message comprises instructions for the wireless device 230 to evaluate in parallel the first handover event and the second handover event. The first handover event is based on signal quality measurements from the primary cell 221 and the neighbour cell 222. The second handover event is based on signal strength measurements from the primary cell 221 and the neighbour cell 222. To evaluate comprises determining if the entering condition for the first handover event is satisfied and if the entering condition for the second handover event is satisfied.

In some embodiments, determining if the entering condition for the first handover event is satisfied comprises determining if the first entering precondition and the second entering precondition are fulfilled. The first entering precondition is based on the comparison of the measurement of signal quality from the primary cell 221 with the first threshold. The second entering precondition is based on the comparison of the measurement of signal quality from the neighbour cell 222 with the second threshold. In these embodiments, determining if the entering condition for the second handover event is satisfied comprises the comparison of the measurement of signal strength from the primary cell 221 with the measurement of signal strength from the neighbour cell 222 and the offset. And also in these embodiments, the difference of the second threshold minus the first threshold is smaller than the offset.

In some embodiments, the first entering precondition is further based on the first hysteresis parameter, and the second entering precondition is further based on at least one of: the first frequency specific offset of a frequency of the neighbour cell 222, the first cell specific offset of the neighbour cell 222, and the first hysteresis parameter. Also in these embodiments, the comparison comprised in the entering condition for the second handover event further comprises at least one of: the second frequency specific offset of a frequency of the neighbour cell 222, the second cell specific offset of the neighbour cell 222, the second hysteresis parameter, the frequency specific offset of a frequency of the primary cell 221 and a cell specific offset of the primary cell 221.

In some particular embodiments, the first entering precondition is:

$$Mp+Hys<Thresh1,$$

the second entering precondition is:

$$Mn+Ofn+Ocn-Hys>Thresh2; \text{ and}$$

the entering condition for the second handover event is:

$$Mn+Ofn+Ocn-Hys>Mp+Ofp+Ocp+Off,$$

wherein:

Mn is: the measurement of signal quality from the neighbour cell 222 in the second entering precondition for the first handover event, and is the measurement of signal strength from the neighbour cell 222 in the entering condition for the second handover event, Ofn is the first frequency specific offset of the frequency of the neighbour cell 222 in the second entering precondition for the first handover event, and is the second frequency specific offset of the frequency of the neighbour cell 222 in the entering condition for the second handover event, Ocn is the first cell specific offset of the neighbour cell 222 in the second entering precondition for the first handover event, and is the second cell specific offset of the neighbour cell 222 in the entering condition for the second handover event, wherein Ocn is set to zero when configured for a cell that is not the neighbour cell 222, Mp is the measurement of signal quality from the primary cell 221 in the first entering precondition for the first handover event, and is the measurement of signal strength from the primary cell 221 in the entering condition for the second handover event, Ofp is the frequency specific offset of the primary frequency of the primary cell 221, Ocp is the cell specific offset of the primary cell 221, and is set to zero when configured for a cell that is not the primary cell 221, Hys is the hysteresis parameter in each of the first handover event and the second handover event, Off is the offset parameter, wherein the offset is an A3 offset parameter for this event, Thresh1 is the threshold parameter for the first entering precondition for the first handover event, Thresh2 is the threshold parameter for the second entering precondition for the first handover event, Thresh1 is expressed in the same unit as Mp in the first entering precondition for the first handover event, and Thresh2 is expressed in the same unit as Mn in the second entering precondition for the first handover event.

In some embodiments, at least one of the measurement of signal strength from the primary cell 221 and the measurement of signal strength from the neighbour cell 222 is a Reference Signal Received Power RSRP.

In some embodiments, at least one of the measurement of signal quality from the primary cell 221 and measurement of signal quality from the neighbour cell 222 is a Reference Signal Received Quality RSRQ or a Signal to Interference and Noise Ratio SINR.

In some embodiments, the primary network node 211 is the same as the neighbour network node 212.

In some embodiments, the handover event is an intrafrequency handover event.

In some embodiments, the handover event is an interfrequency handover event.

In some embodiments, the sending circuit 701 is further configured to send the handover request message to the neighbour network node 212 comprising the handover request, as described above in action 301.

The sending circuit 701 may also be configured to send the handover command to the wireless device 230 when one of: the entering condition for the first handover event is satisfied over the first time period, and the entering condition for the second handover event is satisfied over the second time period. In some particular embodiments, the sending circuit 701 is configured to send the handover command to the wireless device 230 after the primary network node 211 receives the second acknowledgement message comprising the handover request acknowledgement from the neighbour network node 212. In some further particular embodiments, the, the sending circuit 701 may be further configured to may transmit the handover command also via the neighbour cell 222, instead of or in addition to the primary cell 221, as explained above.

The primary network node 211 may also comprise a receiving circuit 702 configured to receive the message from the wireless device 230, when one of: the entering condition for the first handover event is satisfied over a first time period, and the entering condition for the second handover event is satisfied over the second time period, wherein the message comprises the measurement report.

In some embodiments, the receiving circuit 702 is further configured to 211 receive the second acknowledgement message comprising the handover request acknowledgement from the neighbour network node 212.

Figure 7:
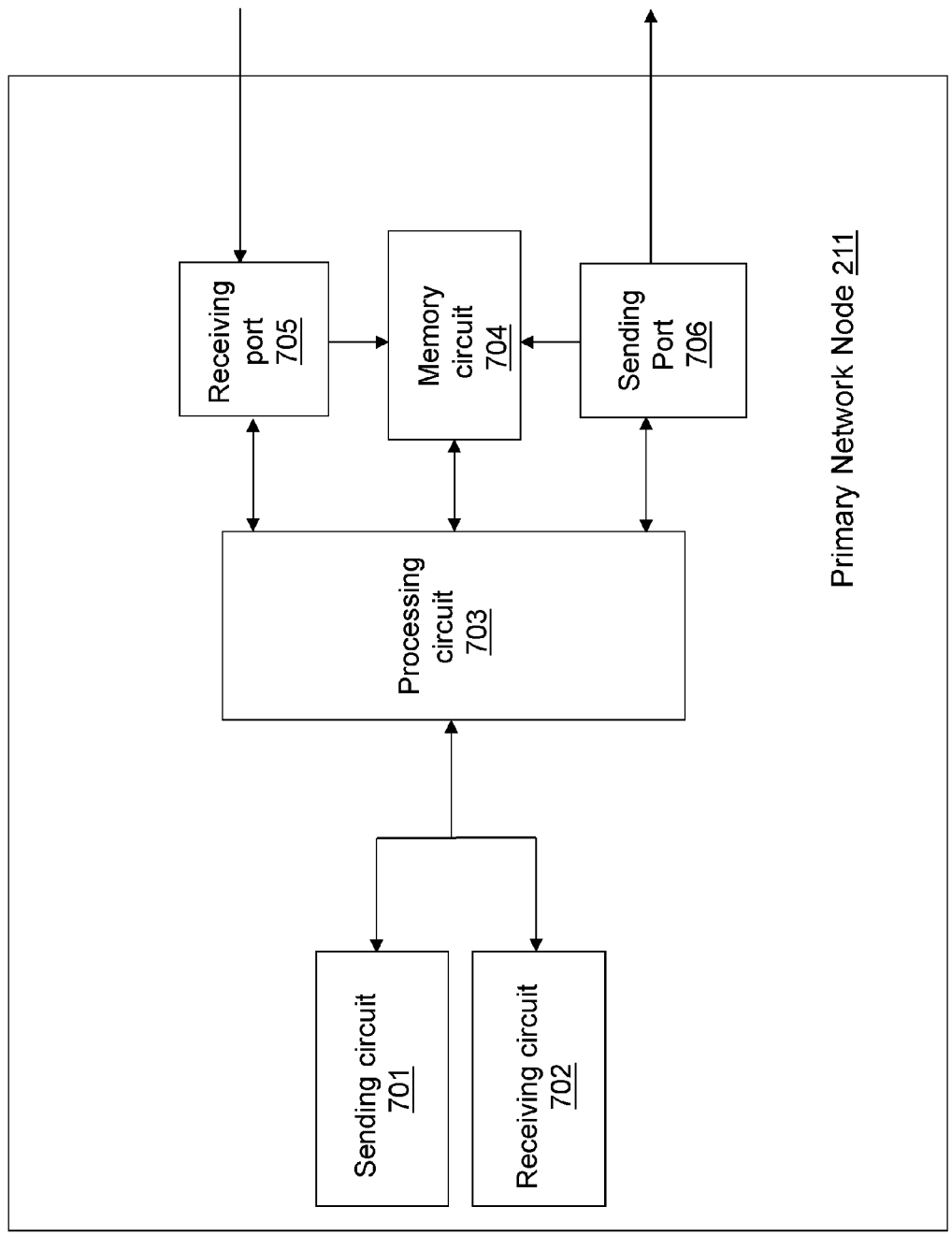
FIG. 7 is a schematic block diagram illustrating embodiments of a primary network node.

The embodiments herein for handling a handover of the wireless device 230 from the primary cell 221 to the neighbour cell 222 may be implemented through one or more processors, such as a processing circuit 703 in the primary network node 211 depicted in FIG. 7, together with computer program code for performing the functions and actions of the embodiments herein. The program code mentioned above may also be provided as a computer program product, for instance in the form of a data carrier carrying computer program code for performing the embodiments herein when being loaded into the in the primary network node 31. One such carrier may be in the form of a CD ROM disc. It may be however feasible with other data carriers such as a memory stick. The computer program code may furthermore be provided as pure program code on a server and downloaded to the primary network node 310.

The primary network node 31 may further comprise a memory circuit 704 comprising one or more memory units. The memory circuit 704 may be arranged to be used to store data such as, the information received by the processing circuit 703 from the wireless device 230 and/or the neighbour cell 222, and applications to perform the methods herein when being executed in the primary network node 211. Memory circuit 704 may be in communication with the processing circuit 703. Any of the other information processed by the processing circuit 703 may also be stored in the memory circuit 704.

In some embodiments, one or more of the messages from the wireless device 230 and/or the neighbour network node 212, described above in relation to FIGS. 3-5a-b, may be received through a receiving port 705. The receiving port 705 may be in communication with the processing circuit 703. The receiving port 705 may also be configured to receive other information.

The processing circuit 703 may be further configured to send one or more of the messages described above in relation to FIGS. 3-5*a-b*, to the wireless device 230 and/or the neighbour network node 212 through a sending port 706, which may be in communication with the processing circuit 703, and the memory circuit 704.

Those skilled in the art will also appreciate that the sending circuit 701 and the receiving circuit 702 described above may refer to a combination of analog and digital circuits, and/or one or more processors configured with software and/or firmware (e.g., stored in memory) that, when executed by the one or more processors such as the processing circuit 703, perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

To perform the method actions in the neighbour network node 212 described above in relation to FIGS. 4-6 for handling a handover of the wireless device 230 from the primary cell 221 to a neighbour cell 222, the neighbour network node 212 comprises the following arrangement depicted in FIG. 8, and as described below. As mentioned above, the primary cell 221 is serviced by the primary network node 211, the neighbour cell 222 is serviced by a neighbour network node 212, and the wireless device 230, the primary network node 211, the primary cell 221, the neighbour network node 212 and the neighbour cell 222 are comprised in the wireless communications network 200.

In some embodiments, the neighbour network node 212 may comprise a receiving circuit 801 configured to receive the second message from the wireless device 230. The second message may comprise the measurement report for reporting the cancelling of the first handover event in the embodiments in which the leaving condition for the first handover event is satisfied over the first time period. The second message may comprise the measurement report for reporting the cancelling of the second handover event in the embodiments in which the leaving condition for the second handover event is satisfied over the second time period.

In some embodiments, the receiving circuit 801 may be further configured to receive the handover request message comprising the handover request from the primary network node 211.

In some embodiments, the receiving circuit 801 may be further configured to receive the random access message from the wireless device 230.

In some embodiments, the receiving circuit 801 may be further configured to receive the reconfiguration message from the wireless device 230 comprising the reconfiguration complete message. In some embodiments, this reconfiguration message comprising the reconfiguration complete message may be an RRC reconfiguration complete message.

The neighbour network node 212 may comprise a sending circuit 802 configured to send the second acknowledgement message to the primary network node 211, the message comprising the handover request acknowledgement.

In some embodiments, the sending circuit 802 may be further configured to send the access grant message to the wireless device 230 comprising the access grant.

Figure 8:
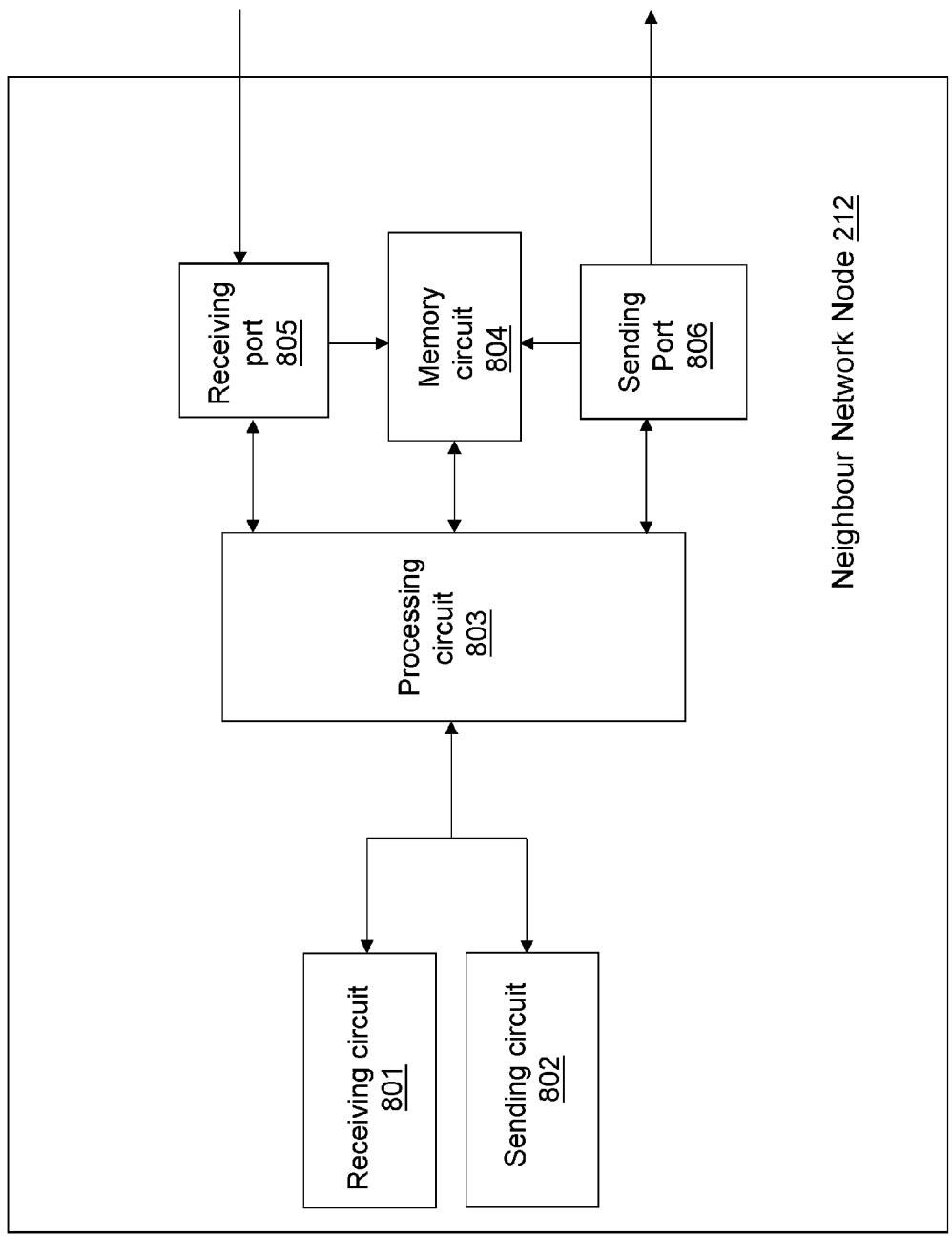
FIG. 8 is a schematic block diagram illustrating embodiments of a neighbour network node.

The embodiments herein for handling a handover event from a primary cell 221 to a neighbour cell 222, as performed by the neighbour network node 212, as described above in relation to FIGS. 5*a-b*, in the pertinent actions performed by the neighbour node 212, may be implemented through one or more processors, such as a processing circuit 803 in the neighbour network node 212 as depicted in FIG. 8, together with computer program code for performing the functions and actions of the embodiments herein, of similar characteristics to those described above for processing circuit 703.

The neighbour network node 212 may further comprise a memory circuit 804, a receiving port 805, and a sending port 806, as depicted in FIG. 8, and of similar characteristics to those described above for memory circuit 704, receiving port 705, and sending port 706, respectively.

Those skilled in the art will also appreciate that the receiving circuit 801 and the sending circuit 802 described above may refer to a combination of analog and digital circuits, and/or one or more processors configured with software and/or firmware (e.g., stored in memory) that, when executed by the one or more processors such as the processing circuit 803, perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

To perform the method actions in the wireless device 230 described above in relation to FIGS. 4-6 for handling a handover of a wireless device 230 from a primary cell 221 to a neighbour cell 222, the wireless device 230 may comprise the following arrangement depicted in FIG. 9, and as described below. As mentioned above, the primary cell 221 is serviced by the primary network node 211, the neighbour cell 222 is serviced by a neighbour network node 212, and the wireless device 230, the primary network node 211, the primary cell 221, the neighbour network node 212 and the neighbour cell 222 are comprised in a wireless communications network 200.

The wireless device 230 comprises a sending circuit 901 configured to send the message from the wireless device 230 to the primary network node 211, when one of: the entering condition for the first handover event is satisfied over the first time period, and the entering condition for the second handover event is satisfied over the second time period, wherein the message comprises the measurement report, as described above. In some embodiments, each of the first time period and the second time period may be the time to trigger.

In some embodiments, the sending circuit 901 is further configured to send the first acknowledgement message to the primary network node 211 to acknowledge having received the configuration message from the primary network node 211. In some particular embodiments, this message sent by the wireless device 230 to acknowledge having received the configuration message from the primary network node 211 is an RRC message comprising a reconfiguration acknowledgement.

In some embodiments, the sending circuit 901 is further configured to send the second message to one or both of: the primary network node 211 and the neighbour network node 212 when either the leaving condition for the first handover event or the leaving condition for the second handover event is satisfied over the time period or the second time period. The second message may comprise the measurement report for reporting the cancelling of the first handover event or the second handover event, respectively.

In some embodiments, the sending circuit 901 is further configured to send the reconfiguration message to the neighbour network node 212 comprising the reconfiguration complete message once the wireless device 230 is granted access to the neighbouring node 212, which in some embodiments may comprise receiving an access grant message from the neighbouring node 212 comprising an access grant. In some embodiments, this reconfiguration message comprising the reconfiguration complete message may be an RRC reconfiguration complete message.

In some embodiments, the wireless device 230 may comprise a receiving circuit 902 configured to receive the configuration message sent by the primary network node 211.

In some embodiments, the receiving circuit 902 may be further configured to receive the handover command from the primary network node 211.

In some embodiments, the receiving circuit 902 may be further configured receive the access grant message from the neighbouring node 212 comprising the access grant In some embodiments, the wireless device 230 may comprise an evaluating circuit 903 configured to evaluate in parallel the first handover event and the second handover event, pursuant to the instructions comprised in the configuration message received from the primary network node 211.

In some further embodiments, the evaluating circuit 903 may be further configured to monitor the reception information received from the primary cell 221 and the neighbour cell 222. In some particular embodiments, the reception information received from the primary cell 221 may be Cell-specific Reference Signals (CRS) as described in the 3GPP TS 36.211 V10.6.0 (2012-12) specification.

In some particular embodiments, the evaluating circuit 903 may be further configured to measure at least one of: the signal strength from the primary cell 221, the signal strength from the neighbour cell 222, the signal quality from the primary cell 221 and the signal quality from the neighbour cell 222.

In some of these embodiments, the evaluating circuit 903 may be configured to measure by recording raw data. In other embodiments, the evaluating circuit 903 may be configured to measure by estimating at least one of: the signal strength from the primary cell 221, the signal strength from the neighbour cell 222, the signal quality from the primary cell 221 and the signal quality from the neighbour cell 222. In these embodiments, estimating comprises collecting additional available and relevant information to enhance the accuracy of the recorded data. For example, additional available and relevant information may be information about the speed of the wireless device 230, Block Error, soft info from receiver, retransmission success rate, power used, geographical position, node configuration, and statistical analysis of data collected. The manner in which this may be implemented is similar to that described in, for example, the 3GPP specification: TS 36.214 Evolved Universal Terrestrial Radio Access (E-UTRA); Physical layer; Measurements.

As described above, in some embodiments described herein, the signal strength from the neighbour cell 222 and the signal strength from the primary cell 221 may be a Reference Signal Received Power RSRP.

In some embodiments described herein, the signal quality from the primary cell 221 and the signal quality from the neighbour cell 222 may be a Reference Signal Received Quality RSRQ or a Signal to Interference Noise Ratio SINR. In some embodiments, the signal quality from the primary cell 221 and the signal quality from the neighbour cell 222, e.g., the RSRQ, may not be layer3 filtered. In other embodiments, the signal quality from the primary cell 221 and the signal quality from the neighbour cell 222 may be a Channel Quality Indicator (CQI), Physical Downlink Control CHannel Block Error Rate (PDCCH BLER), soft information from data decoding, or similar signal quality indicators that will be known by one of skill in the art, and well as a combination of any of these quality signals.

In some particular embodiments, the evaluating circuit 903 may be further configured to determine if the leaving condition for the first handover event is satisfied by determining if the first leaving precondition or the second leaving precondition, are fulfilled, as described above. The first leaving precondition may be based on the measurement of signal quality from the primary cell 221. And the second leaving precondition may be based on the measurement of signal quality from the neighbour cell 222.

In some particular embodiments, the evaluating circuit 903 may be further configured to determine if the leaving condition for the second handover event is satisfied, as described above, the leaving condition for the second handover event being based on a measurement of signal strength from the primary cell 221, and a measurement of signal strength from the neighbour cell 222.

The descriptions of the leaving conditions for the first and second handover event have been described above in action 503, and will therefore not be repeated here. It is understood that in these embodiments, the evaluating circuit 903 may be further configured to determine if the leaving conditions for the first and second events are satisfied according to the description of action 503.

The wireless device 230 may comprise, in some embodiments, an executing circuit 904 configured to execute the handover after having received the handover command from the primary network node 211.

In some particular embodiments the executing circuit 904 may be configured to execute the handover by sending the random access message to the neighbour network node 212. In some of these embodiments, the executing circuit 904 may be further configured to execute the handover by being configured to stop listening to the primary cell 221, configured to retune to the neighbour cell 222, and configured to make handover access to the neighbour cell 222.

Figure 9:
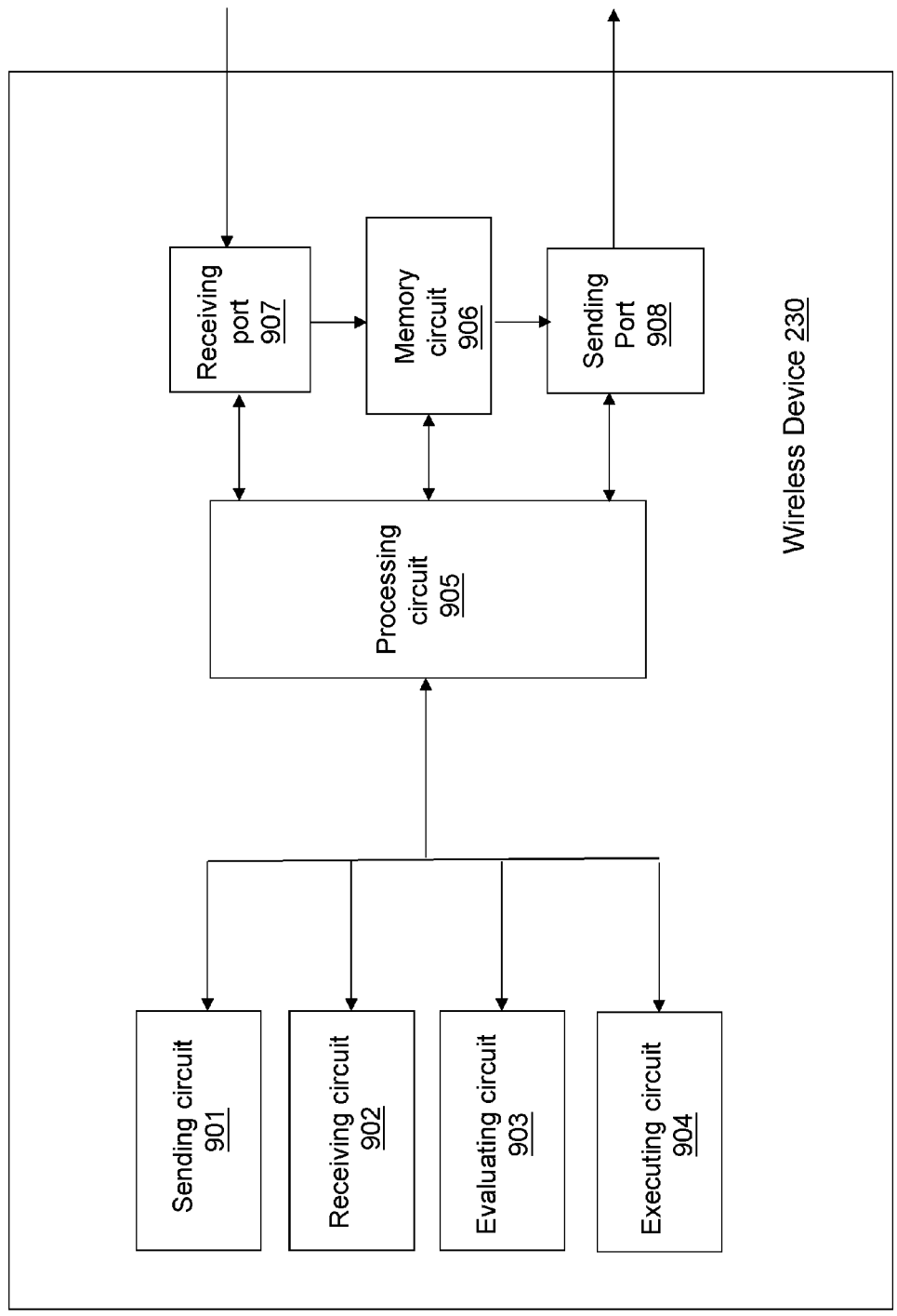
FIG. 9 is a schematic block diagram illustrating embodiments of a wireless device.

The embodiments herein for handling a handover of a wireless device 230 from the primary cell 221 to the neighbour cell 222 may be implemented through one or more processors, such as a processing circuit 905 in the wireless device 230 depicted in FIG. 9, together with computer program code for performing the functions and actions of the embodiments herein. The program code mentioned above may also be provided as a computer program product, for instance in the form of a data carrier carrying computer program code for performing the embodiments herein when being loaded into the in the wireless device 230. One such carrier may be in the form of a CD ROM disc. It may be however feasible with other data carriers such as a memory stick. The computer program code may furthermore be provided as pure program code on a server and downloaded to the wireless device 230.

The wireless device 230 may further comprise a memory circuit 906 comprising one or more memory units. The memory circuit 906 may be arranged to be used to store data such as, the information received by the processing circuit 905 in relation to signalling from the primary cell 221 and/or the neighbour cell 222, and applications to perform the methods herein when being executed in the wireless device 230. Memory circuit 906 may be in communication with the processing circuit 905. Any of the other information processed by the processing circuit 905 may also be stored in the memory circuit 906.

In some embodiments, signalling from the primary cell 221 and/or the neighbour cell 222 may be received through a receiving port 907. The receiving port 907 may be in communication with the processing circuit 905. The receiving port 907 may also be configured to receive other information.

The processing circuit 905 may be further configured to send messages to the primary network node 211 and/or the neighbour network node 212 through a sending port 907, which may be in communication with the processing circuit 905, and the memory circuit 906.

Those skilled in the art will also appreciate that the sending circuit 901, the receiving circuit 902, the evaluating circuit 903, and the executing circuit 904 described above may refer to a combination of analog and digital circuits, and/or one or more processors configured with software and/or firmware (e.g., stored in memory) that, when executed by the one or more processors such as the processing circuit 905, perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention, which is defined by the appending claims.

The invention claimed is:

1. A method in a primary network node for handling a handover of a wireless device from a primary cell to a neighbor cell; the primary cell being serviced by the primary network node; the neighbor cell being serviced by a neighbor network node; and the wireless device, the primary network node, the primary cell, the neighbor network node and the neighbor cell being comprised in a wireless communications network; the method comprising:
sending a configuration message to the wireless device, the configuration message comprising instructions for the wireless device to evaluate in parallel a first handover event based on signal quality measurements from the primary cell and the neighbor cell, and a second handover event based on signal strength measurements from the primary cell and the neighbor cell, wherein the evaluating comprises determining if an entering condition for the first handover event is satisfied and if an entering condition for the second handover event is satisfied; and
sending a handover command to the wireless device in response to either of:
the entering condition for the first handover event is satisfied over a first time period; and
the entering condition for the second handover event is satisfied over a second time period.

2. The method of claim 1:
wherein the determining if the entering condition for the first handover event is satisfied comprises determining if a first entering precondition and a second entering precondition are fulfilled;
wherein the first entering precondition is based on a comparison of a measurement of signal quality from the primary cell with a first threshold; and
wherein the second entering precondition is based on a comparison of a measurement of signal quality from the neighbor cell with a second threshold;
wherein determining if the entering condition for the second handover event is satisfied comprises a comparison of a measurement of signal strength from the primary cell with a measurement of signal strength from the neighbor cell and an offset;
wherein a difference of the second threshold minus the first threshold is smaller than the offset.

3. The method of claim 1:
further comprising receiving a message from the wireless device, in response to either of:
the entering condition for the first handover event is satisfied over a first time period; and
the entering condition for the second handover event is satisfied over a second time period;
wherein the message comprises a measurement report.

4. The method of claim 2:
wherein the first entering precondition is further based on a first hysteresis parameter;
wherein the second entering precondition is further based on at least one of: a first frequency specific offset of a frequency of the neighbor cell, a first cell specific offset of the neighbor cell, and the first hysteresis parameter; and
wherein the comparison associated with the entering condition for the second handover event further comprises at least one of: a second frequency specific offset of a frequency of the neighbor cell, a second cell specific offset of the neighbor cell, a second hysteresis parameter, a frequency specific offset of a frequency of the primary cell, and a cell specific offset of the primary cell.

5. The method of claim 4, wherein:
the first entering precondition is:

$$Mp+Hys<\text{Thresh 1};$$

the second entering precondition is:

$$Mn+Ofn+Ocn-Hys>\text{Thresh 2};$$

the entering condition for the second handover event is:

$$Mn+Ofn+Ocn-Hys>Mp+Ofp+Ocp+\text{Off};$$

wherein:
Mn is: the measurement of signal quality from the neighbor cell in the second entering precondition for the first handover event, and the measurement of signal strength from the neighbor cell in the entering condition for the second handover event;
Ofn is the first frequency specific offset of the frequency of the neighbor cell in the second entering precondition for the first handover event, and the second frequency specific offset of the frequency of the neighbor cell in the entering condition for the second handover event;
Ocn is the first cell specific offset of the neighbor cell in the second entering precondition for the first handover event, and the second cell specific offset of the neighbor cell in the entering condition for the second handover event; wherein Ocn is set to zero when configured for a cell that is not the neighbor cell;

Mp is the measurement of signal quality from the primary cell in the first entering precondition for the first handover event, and the measurement of signal strength from the primary cell in the entering condition for the second handover event;

Ofp is the frequency specific offset of the primary frequency of the primary cell;

Ocp is the cell specific offset of the primary cell, and is set to zero when configured for a cell that is not the primary cell;

Hys is the hysteresis parameter in each of the first handover event and the second handover event;

Off is the offset parameter, wherein the offset is an A3 offset parameter for this event;

Thresh1 is the threshold parameter for the first entering precondition for the first handover event;

Thresh2 is the threshold parameter for the second entering precondition for the first handover event;

Thresh1 is expressed in the same unit as Mp in the first entering precondition for the first handover event; and Thresh2 is expressed in the same unit as Mn in the second entering precondition for the first handover event.

6. The method of claim 5, wherein at least one of the measurement of signal strength from the primary cell and the measurement of signal strength from the neighbor cell is a Reference Signal Received Power.

7. The method of claim 5, wherein at least one of the measurement of signal quality from the primary cell and measurement of signal quality from the neighbor cell is a Reference Signal Received Quality or a Signal to Interference and Noise Ratio.

8. The method of claim 1, wherein the primary network node is the same as the neighbor network node.

9. The method of claim 1, wherein the first handover event and the second handover event are intrafrequency handover events.

10. The method of claim 1, wherein the first handover event and the second handover event are interfrequency handover events.

11. The method of claim 1, wherein the sending a handover command to the wireless device is in response to both:
the entering condition for the first handover event being satisfied over a first time period; and
the entering condition for the second handover event being satisfied over a second time period.

12. The method of claim 1, wherein the first time period and the second time period are defined in the configuration message sent to the wireless device by the primary network node.

13. A primary network node for handling a handover of a wireless device from a primary cell to a neighbor cell; the primary cell being serviced by the primary network node; the neighbor cell being serviced by a neighbor network node; wherein the wireless device, the primary network node, the primary cell, the neighbor network node, and the neighbor cell are comprised in a wireless communications network; the primary network node comprising a processor and a memory, the memory containing instructions executable by said processor whereby the primary network node is configured to:
send a configuration message to the wireless device, wherein the configuration message comprises instructions for the wireless device to evaluate in parallel a first handover event based on signal quality measurements from the primary cell and the neighbor cell, and a second handover event based on signal strength measurements from the primary cell and the neighbor cell, wherein the evaluating comprises determining if an entering condition for the first handover event is satisfied and if an entering condition for the second handover event is satisfied;
send a handover command to the wireless device in response to either of:
the entering condition for the first handover event is satisfied over a first time period; and
the entering condition for the second handover event is satisfied over a second time period.

14. The primary network node of claim 13:
wherein the determining if the entering condition for the first handover event is satisfied comprises determining if a first entering precondition and a second entering precondition are fulfilled;
wherein the first entering precondition is based on a comparison of a measurement of signal quality from the primary cell with a first threshold;
wherein the second entering precondition is based on a comparison of a measurement of signal quality from the neighbor cell with a second threshold;
wherein the determining if the entering condition for the second handover event is satisfied comprises a comparison of a measurement of signal strength from the primary cell with a measurement of signal strength from the neighbor cell and an offset;
wherein the difference of the second threshold minus the first threshold is smaller than the offset.

15. The primary network node of claim 13:
further comprising a receiving circuit configured to receive a message, from the wireless device, in response either of:
the entering condition for the first handover event is satisfied over a first time period;
the entering condition for the second handover event is satisfied over a second time period;
wherein the message comprises a measurement report.

16. The primary network node of claim 14:
wherein the first entering precondition is further based on a first hysteresis parameter;
wherein the second entering precondition is further based on at least one of: a first frequency specific offset of a frequency of the neighbor cell, a first cell specific offset of the neighbor cell, and the first hysteresis parameter; and
wherein the comparison associated with the entering condition for the second handover event further comprises at least one of: a second frequency specific offset of a frequency of the neighbor cell, a second cell specific offset of the neighbor cell, a second hysteresis parameter, a frequency specific offset of a frequency of the primary cell, and a cell specific offset of the primary cell.

17. The primary network node of claim 16, wherein:
the first entering precondition is:

$Mp+Hys<Thresh1;$ the second entering precondition is:

$Mn+Ofn+Ocn-Hys>Thresh2;$ the entering condition for the second handover event is:

$Mn+Ofn+Ocn-Hys>Mp+Ofp+Ocp+Off;$ wherein:
Mn is: the measurement of signal quality from the neighbor cell in the second entering precondition for the first handover event, and the measurement of signal strength from the neighbor cell in the entering condition for the second handover event;

Ofn is the first frequency specific offset of the frequency of the neighbor cell in the second entering precondition for the first handover event, and the second frequency specific offset of the frequency of the neighbor cell in the entering condition for the second handover event;

Ocn is the first cell specific offset of the neighbor cell in the second entering precondition for the first handover event, and the second cell specific offset of the neighbor cell in the entering condition for the second handover event; wherein Ocn is set to zero when configured for a cell that is not the neighbor cell;

Mp is the measurement of signal quality from the primary cell in the first entering precondition for the first handover event, and the measurement of signal strength from the primary cell in the entering condition for the second handover event;

Ofp is the frequency specific offset of the primary frequency of the primary cell;

Ocp is the cell specific offset of the primary cell, and is set to zero when configured for a cell that is not the primary cell;

Hys is the hysteresis parameter in each of the first handover event and the second handover event;

Off is the offset parameter, wherein the offset is an A3 offset parameter for this event;

Thresh1 is the threshold parameter for the first entering precondition for the first handover event;

Thresh2 is the threshold parameter for the second entering precondition for the first handover event;

Thresh1 is expressed in the same unit as Mp in the first entering precondition for the first handover event; and Thresh2 is expressed in the same unit as Mn in the second entering precondition for the first handover event.

18. The primary network node of claim 17, wherein at least one of the measurement of signal strength from the primary cell and the measurement of signal strength from the neighbor cell is a Reference Signal Received Power (RSRP).

19. The primary network node of claim 17, wherein at least one of the measurement of signal quality from the primary cell and measurement of signal quality from the neighbor cell is a Reference Signal Received Quality (RSRQ) or a Signal to Interference and Noise Ratio (SINR).

20. The primary network node of claim 13, wherein the primary network node is the same as the neighbor network node.

21. The primary network node of claim 13, wherein the first handover event and the second handover event are intrafrequency handover events.

22. The primary network node of claim 13, wherein the first handover event and the second handover event are interfrequency handover events.

23. A method, in a wireless device, for handling a handover of the wireless device from a primary cell to a neighbor cell; the primary cell being serviced by a primary network node; the neighbor cell being serviced by a neighbor network node; wherein the wireless device, the primary network node, the primary cell, the neighbor network node, and the neighbor cell are comprised in a wireless communications network, the method comprising:

receiving, from the primary network node, a configuration message at the wireless device, wherein the configuration message comprises instructions for the wireless device to evaluate in parallel a first handover event based on signal quality measurements from the primary cell and the neighbor cell, and a second handover event based on signal strength measurements from the primary cell and the neighbor cell;

evaluating in parallel the first handover event and the second handover event, wherein the evaluating comprises determining if an entering condition for the first handover event is satisfied and if an entering condition for the second handover event is satisfied;

sending a first message from the wireless device to the primary network node in response to either of:
the entering condition for the first handover event is satisfied over a first time period; and
the entering condition for the second handover event is satisfied over a second time period, wherein the first message comprises a measurement report;

receiving a handover command from the primary network node at the wireless device in response to the primary network node receiving the first message.

24. A wireless device for handling a handover of the wireless device from a primary cell to a neighbor cell; the primary cell being serviced by a primary network node; the neighbor cell being serviced by a neighbor network node; wherein the wireless device, the primary network node, the primary cell, the neighbor network node, and the neighbor cell are comprised in a wireless communications network, the wireless device comprising a processor and a memory, the memory containing instructions executable by said processor whereby said apparatus is configured to:

receive from the primary network node a configuration message at the wireless device, wherein the configuration message comprises instructions for the wireless device to evaluate in parallel a first handover event based on signal quality measurements from the primary cell and the neighbor cell, and a second handover event based on signal strength measurements from the primary cell and the neighbor cell;

evaluate in parallel the first handover event and the second handover event by determining if an entering condition for the first handover event is satisfied and if an entering condition for the second handover event is satisfied;

send a first message to the primary network node in response to either of:
the entering condition for the first handover event is satisfied over a first time period; and
the entering condition for the second handover event is satisfied over a second time period;

wherein the first message comprises a measurement report;

receive a handover command from the primary network node at the wireless device in response to the primary network node receiving the first message.

* * * * *